United States Patent
Bae et al.

(10) Patent No.: US 10,313,207 B2
(45) Date of Patent: *Jun. 4, 2019

(54) METHOD FOR TESTING CLOUD STREAMING SERVER, AND APPARATUS AND SYSTEM THEREFOR

(71) Applicant: SK TECHX CO., LTD., Seoul (KR)

(72) Inventors: Tae-Meon Bae, Seoul (KR); Hyun-Sik Na, Bucheon-si (KR); Hong-Seo Yun, Incheon (KR); Jung-Keun Yang, Seoul (KR); Jong-Hyun Kim, Seoul (KR)

(73) Assignee: SK TECHX CO., LTD., Seoul (KR)

( * ) Notice: Subject to any disclaimer, the term of this patent is extended or adjusted under 35 U.S.C. 154(b) by 95 days.

This patent is subject to a terminal disclaimer.

(21) Appl. No.: 15/123,213

(22) PCT Filed: Dec. 15, 2014

(86) PCT No.: PCT/KR2014/012350
§ 371 (c)(1),
(2) Date: Sep. 1, 2016

(87) PCT Pub. No.: WO2015/137604
PCT Pub. Date: Sep. 17, 2015

(65) Prior Publication Data
US 2017/0078159 A1 Mar. 16, 2017

(30) Foreign Application Priority Data

Mar. 10, 2014 (KR) .................. 10-2014-0028005
Mar. 10, 2014 (KR) .................. 10-2014-0028006
(Continued)

(51) Int. Cl.
G06F 15/16 (2006.01)
H04L 12/24 (2006.01)
(Continued)

(52) U.S. Cl.
CPC .......... *H04L 41/5038* (2013.01); *H04L 43/50* (2013.01); *H04L 65/4015* (2013.01);
(Continued)

(58) Field of Classification Search
CPC ......... H04L 12/24; H04L 12/26; H04L 65/80; H04L 65/604; H04L 65/4015;
(Continued)

(56) References Cited

U.S. PATENT DOCUMENTS

2005/0132258 A1* 6/2005 Chen .................. H04L 1/0061
714/704
2007/0033441 A1* 2/2007 Sathe .................. G06F 11/36
714/38.14
(Continued)

FOREIGN PATENT DOCUMENTS

EP           3 096 229 A1    11/2016
KR    10-2007-0021421 A      2/2007
(Continued)

OTHER PUBLICATIONS

International Search Report dated Mar. 6, 2015 for PCT/KR2014/012350, citing the above reference(s).
(Continued)

*Primary Examiner* — Benjamin M Thieu
(74) *Attorney, Agent, or Firm* — Brinks Gilson & Lione

(57) ABSTRACT

A method for testing a cloud streaming server, and an apparatus and a system therefor are disclosed. Test result videos are created by receiving, from cloud streaming servers, test results corresponding to the key input of a preset test script; masked videos are created by masking the test result videos; and it is determined whether at least any one of the cloud streaming servers has a failure by mutually comparing test result images created by capturing the masked videos.

10 Claims, 14 Drawing Sheets

(30) Foreign Application Priority Data

| May 28, 2014 | (KR) | 10-2014-0064377 |
|---|---|---|
| May 28, 2014 | (KR) | 10-2014-0064380 |
| Jun. 3, 2014 | (KR) | 10-2014-0067781 |

(51) Int. Cl.
  *H04N 21/24* (2011.01)
  *H04N 17/00* (2006.01)
  *H04L 12/26* (2006.01)
  *H04L 29/06* (2006.01)

(52) U.S. Cl.
  CPC ............ *H04L 65/604* (2013.01); *H04L 65/80* (2013.01); *H04N 17/004* (2013.01); *H04N 21/24* (2013.01)

(58) Field of Classification Search
  CPC ..... H04L 43/50; H04L 41/5038; H04N 21/24; H04N 17/00; H04N 17/004
  See application file for complete search history.

(56) References Cited

U.S. PATENT DOCUMENTS

| 2007/0157274 | A1* | 7/2007 | Chiu | H04N 17/004 |
|---|---|---|---|---|
| | | | | 725/107 |
| 2008/0126899 | A1* | 5/2008 | Brennan | G01R 31/31907 |
| | | | | 714/732 |
| 2011/0276946 | A1 | 11/2011 | Pletter | |
| 2012/0254664 | A1* | 10/2012 | Silva | H04N 17/045 |
| | | | | 714/32 |
| 2013/0019242 | A1* | 1/2013 | Chen | H04L 41/145 |
| | | | | 718/1 |
| 2014/0032638 | A1* | 1/2014 | Park | H04L 67/42 |
| | | | | 709/203 |
| 2014/0115395 | A1* | 4/2014 | Tseng | G06F 11/22 |
| | | | | 714/32 |
| 2014/0325479 | A1* | 10/2014 | Barak | G06F 11/3688 |
| | | | | 717/124 |
| 2016/0328281 | A1* | 11/2016 | Lee | G06F 11/277 |
| 2017/0111258 | A1* | 4/2017 | Bezold | H04L 43/50 |

FOREIGN PATENT DOCUMENTS

| KR | 10-2007-0058941 A | 6/2007 |
|---|---|---|
| KR | 10-2010-0065046 A | 6/2010 |
| KR | 10-2012-0063499 A | 6/2012 |
| KR | 10-2012-0114484 A | 10/2012 |
| KR | 10-2012-0121950 A | 11/2012 |
| KR | 10-2013-0042327 A | 4/2013 |
| KR | 10-2013-0075777 A | 7/2013 |
| KR | 10-2014-0011530 A | 1/2014 |

OTHER PUBLICATIONS

European Search Report dated Oct. 5, 2017 corresponding to European Patent Application No. EP 14 88 5807, citing the above reference(s).

\* cited by examiner

METHOD FOR TESTING CLOUD STREAMING SERVER, AND APPARATUS AND SYSTEM THEREFOR

CROSS-REFERENCE TO RELATED APPLICATION

The present application claims priorities to and benefits of Korean Patent Application Nos. 10-2014-0028005, filed on Mar. 10, 2014, 10-2014-0028006, filed on Mar. 10, 2014, 10-2014-0064377, filed on May 28, 2014, 10-2014-0064380, filed on May 28, 2014, and 10-2014-0067781, filed on Jun. 3, 2014, which are hereby incorporated by reference herein in its entirety.

TECHNICAL FIELD

The present invention relates to a cloud streaming server test method and an apparatus and system for the method. More particularly, this invention relates to a cloud streaming server test method, together with an apparatus and system therefor, for preventing unnecessary errors when testing whether a cloud streaming service server operates normally.

BACKGROUND

A cloud computing, which is internet-based computer technology, offers environments in which a user can use necessary software at any time through internet access without installing it in his or her computer and also easily share data by means of various information communication devices. Namely, an individual user can use a program such as Photoshop, Office, etc. by accessing a web and also store a resultant outcome in the web. Consequently, many users can work individually through a single server (i.e., a computer) disposed in a virtual space. An automated teller machine (ATM) of a bank and a real-time reservation system of aircraft or train are representative examples.

With the growth of information technology (IT), with the expansion of an application market, and with the activation of a social network service (SNS), data traffic such as users' contents is increasing explosively in these days. Additionally, excessive data traffic incurs an uncontrollable situation beyond each individual terminal's capacity. A cloud system is expected to solve favorably such an undesirable situation. Further, this cloud system will become the foundation for constructing a small-sized device environment.

For example, when a service or function that requires large-volume image processing is executed, this service or function may be executed at a server based on the cloud computing. Then the server transmits only a screen of execution result to a user terminal, using streaming technique. Therefore, the user can use, at his or her terminal, a service or function that requires higher specifications or higher functionality.

This technique to enable a user terminal to use various services or functions through image virtualization for executing a specific service or function in response to a request of the user terminal and then sending an execution result to the user terminal is referred to as a cloud streaming service.

In a computing environment based on this cloud streaming service, since main services or function are executed at a server, technique to detect in advance whether there is any failure in the server is required.

SUMMARY

The present invention, which is proposed to solve the aforesaid conventional problem, provides a cloud streaming server test method for testing whether a server for providing a cloud streaming service operates normally, and also provides an apparatus and system for the method.

Particularly, an object of the present invention is to prevent a test error, by capturing a test result screen after masking a part, to which an animation effect is applied, when receiving such test result screens from a plurality of cloud streaming servers, then comparing the received screens with each other, and thereby detecting a failure of the cloud streaming server.

Additionally, an object of the present invention is to prevent the distortion of a test result due to a failure of a reference server, by changing the reference server when the predetermined number of errors, or more, are detected as the result of comparing test result screens received from a plurality of cloud streaming servers.

Additionally, an object of the present invention is to test both an operation error and a connection error of a cloud streaming server, by detecting the connection error of the cloud streaming server simultaneously with detecting a failure of the cloud streaming server through comparison of test result screens received from a plurality of cloud streaming servers.

Additionally, an object of the present invention is to prevent a test error, by capturing a test result screen at a proper timing when receiving such test result screens from a plurality of cloud streaming servers, then comparing the received screens with each other, and thereby detecting a failure of the cloud streaming server.

Additionally, an object of the present invention is to enhance test efficiency and to minimize an error in test results, by transmitting, to a cloud streaming server, a common test script key input enabling applications to create a common screen when receiving such test result screens from a plurality of cloud streaming servers, then comparing the received screens with each other, and thereby detecting a failure of the cloud streaming server.

TECHNICAL SOLUTION

In order to achieve the above objects, a cloud streaming server test apparatus according to this invention includes virtual client modules configured to receive test results corresponding to a predetermined test script key input from cloud streaming servers and to create test result videos; a comparison unit configured to create masked videos by masking the test result videos and to compare test result images, created by capturing the masked videos, with each other; and a test control unit configured to determine, based on a comparison result, whether at least one of the cloud streaming servers has a failure.

In this apparatus, the comparison unit may mask a part, to which an animation effect is applied, in the test result videos.

In this apparatus, the comparison unit may determine a reference server among the cloud streaming servers and then compare a test result image, created by capturing the masked video corresponding to the reference server, with test result images created by capturing the masked videos corresponding to other cloud streaming servers.

In this apparatus, if compared two images are identical with each other, the test control unit may determine that there is no failure in the cloud streaming server. If compared two images are not identical with each other, the test control unit may determine that there is a failure in the cloud streaming server.

In this apparatus, the test result images corresponding to the other cloud streaming servers may be captured at the same time point as the test result image corresponding to the reference server.

Additionally, a cloud streaming server test method according to this invention includes step of receiving test results corresponding to a predetermined test script key input from cloud streaming servers and creating test result videos; step of creating masked videos by masking the test result videos; step of comparing test result images, created by capturing the masked videos, with each other; and step of determining, based on a comparison result, whether at least one of the cloud streaming servers has a failure.

In this method, the step of creating the masked video may include masking a part, to which an animation effect is applied, in the test result videos.

In this method, the comparing step may include determining a reference server among the cloud streaming servers and then comparing a test result image, created by capturing the masked video corresponding to the reference server, with test result images created by capturing the masked videos corresponding to other cloud streaming servers.

In this method, the determining step may include, if compared two images are identical with each other, determining that there is no failure in the cloud streaming server, and if compared two images are not identical with each other, determining that there is a failure in the cloud streaming server.

In this method, the test result images corresponding to the other cloud streaming servers may be captured at the same time point as the test result image corresponding to the reference server.

Additionally, a cloud streaming server test system according to this invention includes cloud streaming servers configured to transmit test results corresponding to a test script key input predetermined for testing a failure; and a test apparatus configured to create masked videos by masking the test result videos, to compare test result images, created by capturing the masked videos, with each other, and to determine whether at least one of the cloud streaming servers has a failure.

In order to achieve the above objects, a cloud streaming server test apparatus according to this invention includes virtual client modules configured to receive test results corresponding to a predetermined test script key input from cloud streaming servers and to create test result videos; a comparison unit configured to compare a test result image, created by capturing the test result video corresponding to a reference server which is one of the cloud streaming servers, with test result images created by capturing the test result videos corresponding to the other cloud streaming servers; and a test control unit configured to determine, based on a comparison result, whether at least one of the cloud streaming servers has a failure, and to change the reference server when a change condition for the reference server is satisfied.

In this apparatus, if compared two images are identical with each other, the test control unit may determine that there is no failure in the cloud streaming server. If compared two images are not identical with each other, the test control unit may determine that there is a failure in the cloud streaming server.

In this apparatus, the test result images corresponding to the other cloud streaming servers may be captured at the same time point as the test result image corresponding to the reference server.

In this apparatus, the change condition for the reference server may indicate that the number of cloud streaming servers determined as having a failure is greater than a predetermined reference value.

In this apparatus, if the number of cloud streaming servers determined as having failures before changing the reference server is greater, by a predetermined number or more, than the number of cloud streaming servers determined as having failures after changing the reference server, the test control unit may determine that there is a failure in the reference server before changed.

A method for changing a reference server for testing a cloud streaming server according to this invention includes step of, at virtual client modules, receiving test results from cloud streaming servers and creating test result videos; step of comparing a test result image, created by capturing the test result video corresponding to a reference server which is one of the cloud streaming servers, with test result images created by capturing the test result videos corresponding to the other cloud streaming servers; step of determining, based on a comparison result, whether at least one of the cloud streaming servers has a failure; and step of changing the reference server when a change condition for the reference server is satisfied.

In this method, the test result images corresponding to the other cloud streaming servers may be captured at the same time point as the test result image corresponding to the reference server.

This method may further include step of, if the number of cloud streaming servers determined as having failures before changing the reference server is greater, by a predetermined number or more, than the number of cloud streaming servers determined as having failures after changing the reference server, determining that there is a failure in the reference server before changed.

In this method, the step of determining that there is a failure in the reference server may include determining such a failure when compared two images are not identical with each other.

A cloud streaming server test system according to this invention includes cloud streaming servers configured to transmit test results corresponding to a test script key input predetermined for testing a failure; and a test apparatus configured to compare a test result image, created by capturing the test result video corresponding to a reference server which is one of the cloud streaming servers, with test result images created by capturing the test result videos corresponding to the other cloud streaming servers, to determine, based on a comparison result, whether at least one of the cloud streaming servers has a failure, and to change the reference server when a change condition for the reference server is satisfied.

Additionally, this invention provides a computer-readable medium recording thereon a program that executes the above method for changing a reference server for testing a cloud streaming server.

In order to achieve the above objects, a cloud streaming server test apparatus according to this invention includes virtual client modules configured to receive test results corresponding to a predetermined test script key input from cloud streaming servers and to create test result videos; a test unit configured to detect an error in a connection between the virtual client modules and the cloud streaming servers and to compare a test result image, created by capturing the test result video corresponding to a reference server which is one of the cloud streaming servers, with test result images created by capturing the test result videos corresponding to the other cloud streaming servers; and a test control unit configured to determine, based on a comparison result and a connection error detection result, whether at least one of the cloud streaming servers has a failure.

In this apparatus, if compared two images are identical with each other, the test control unit may determine that there is no failure in the cloud streaming server. If compared two images are not identical with each other, the test control unit may determine that there is a failure in the cloud streaming server.

In this apparatus, the test result images corresponding to the other cloud streaming servers may be captured at the same time point as the test result image corresponding to the reference server.

In this apparatus, the connection error may include one or more of a failure in a connection try, from one of the client modules to one of the cloud streaming servers, and a failure in a test result transmission.

In this apparatus, if the connection error is detected, the test unit may not perform a test by comparison with the reference server with regard to the cloud streaming server corresponding to the connection error.

In this apparatus, the test control unit may create a failure report by distinguishing a failure corresponding the connection error from a failure corresponding to a comparison result indicating that two compared images are not identical.

A cloud streaming server test method according to this invention includes step of, at virtual client modules, receiving test results from cloud streaming servers and creating test result videos; step of detecting an error in a connection between the virtual client modules and the cloud streaming servers; step of comparing a test result image, created by capturing the test result video corresponding to a reference server which is one of the cloud streaming servers, with test result images created by capturing the test result videos corresponding to the other cloud streaming servers; and step of determining, based on a comparison result and a connection error detection result, whether at least one of the cloud streaming servers has a failure.

In this method, the test result images corresponding to the other cloud streaming servers may be captured at the same time point as the test result image corresponding to the reference server.

In this method, the connection error may include one or more of a failure in a connection try, from one of the client modules to one of the cloud streaming servers, and a failure in a test result transmission.

In this method, if the connection error is detected, a test by comparison with the reference server may be not performed with regard to the cloud streaming server corresponding to the connection error.

In this method, the step of determining a failure may include creating a failure report by distinguishing a failure corresponding the connection error from a failure corresponding to a comparison result indicating that two compared images are not identical.

A cloud streaming server test system according to this invention includes cloud streaming servers configured to transmit test results corresponding to a test script key input predetermined for testing a failure; and a test apparatus configured to detect an error in a connection with the cloud streaming servers, to compare a test result image, created by capturing the test result video corresponding to a reference server which is one of the cloud streaming servers, with test result images created by capturing the test result videos corresponding to the other cloud streaming servers, and to determine whether at least one of the cloud streaming servers has a failure.

Additionally, this invention provides a computer-readable medium recording thereon a program that executes the above cloud streaming server test method.

In order to achieve the above objects, a cloud streaming server test apparatus according to this invention includes virtual client modules configured to receive test results corresponding to a predetermined test script key input from cloud streaming servers and to create test result videos; a comparison unit configured to compare a test result image, created by capturing, after a steady state condition is satisfied, the test result video corresponding to a reference server which is one of the cloud streaming servers, with test result images created by capturing, after a steady state condition is satisfied, the test result videos corresponding to the other cloud streaming servers; and a test control unit configured to determine, based on a comparison result, whether at least one of the cloud streaming servers has a failure.

In this apparatus, the steady state condition may be an elapse condition of a predetermined time which is determined according to the predetermined test script key input.

In this apparatus, whether the elapse condition is satisfied or not may be determined depending on whether the predetermined time elapses from the timing when the predetermined test script key input is transmitted.

In this apparatus, the steady state condition may be determined differently depending on the predetermined test script key input.

In this apparatus, if compared two images are identical with each other, the test control unit may determine that there is no failure in the cloud streaming server. If compared two images are not identical with each other, the test control unit may determine that there is a failure in the cloud streaming server.

In this apparatus, the test result images corresponding to the other cloud streaming servers may be captured at the same time point as the test result image corresponding to the reference server.

A cloud streaming server test apparatus according to this invention includes step of, at virtual client modules, receiving test results from cloud streaming servers and creating test result videos; step of determining whether a steady state condition is satisfied; step of, if the steady state condition is satisfied, creating test result images by capturing the test result video, corresponding to a reference server which is one of the cloud streaming servers, and the test result videos corresponding to the other cloud streaming servers; step of comparing the test result image, created by capturing the test result video corresponding to the reference server, with the test result images created by capturing the test result videos corresponding to the other cloud streaming servers; and step of determining, based on a comparison result, whether at least one of the cloud streaming servers has a failure.

In this method, the steady state condition may be an elapse condition of a predetermined time which is determined according to the predetermined test script key input.

In this method, whether the elapse condition is satisfied or not may be determined depending on whether the predetermined time elapses from the timing when the predetermined test script key input is transmitted.

In this method, the steady state condition may be determined differently depending on the predetermined test script key input.

In this method, if compared two images are identical with each other, the test control unit may determine that there is no failure in the cloud streaming server. If compared two images are not identical with each other, the test control unit may determine that there is a failure in the cloud streaming server.

In this method, the test result images corresponding to the other cloud streaming servers may be captured at the same time point as the test result image corresponding to the reference server.

A cloud streaming server test system according to this invention includes cloud streaming servers configured to transmit test results corresponding to a test script key input predetermined for testing a failure; and a test apparatus configured to compare a test result image, created by capturing, after a steady state condition is satisfied, the test result video corresponding to a reference server which is one of the cloud streaming servers, with test result images created by capturing, after a steady state condition is satisfied, the test result videos corresponding to the other cloud streaming servers, and to determine whether at least one of the cloud streaming servers has a failure.

In order to achieve the above objects, a cloud streaming server test apparatus according to this invention includes virtual client modules configured to transmit a common test script key input corresponding to a common screen to cloud streaming servers, to receive test results corresponding to the common test script key input from the cloud streaming servers, and to create test result videos; a comparison unit configured to compare a reference result image, corresponding to the common screen, with one or more of test result images created by capturing the test result videos corresponding to the cloud streaming servers; and a test control unit configured to determine, based on a comparison result, whether at least one of the cloud streaming servers has a failure.

In this apparatus, the common test script key input may enable two or more different applications to create the same common screen.

In this apparatus, the common screen may be a screen from which an animation effect is excluded.

In this apparatus, if compared two images are identical with each other, the test control unit may determine that there is no failure in the cloud streaming server. If compared two images are not identical with each other, the test control unit may determine that there is a failure in the cloud streaming server.

In this apparatus, the test result images corresponding to the cloud streaming servers may be captured at the same time point as the reference result image.

A cloud streaming server test method according to this invention includes step of, at virtual client modules, creating a common test script key input corresponding to a common screen; step of, at the virtual client modules, receiving test results corresponding to the common test script key input from the cloud streaming servers and creating test result videos; step of comparing a reference result image, corresponding to the common screen, with one or more of test result images created by capturing the test result videos; and step of determining, based on a comparison result, whether at least one of the cloud streaming servers has a failure.

In this method, the common test script key input may enable two or more different applications to create the same common screen.

In this method, the common screen may be a screen from which an animation effect is excluded.

In this method, the test result images corresponding to the cloud streaming servers may be captured at the same time point as the reference result image.

In this method, the determining step may include, if compared two images are identical with each other, determining that there is no failure in the cloud streaming server, and if compared two images are not identical with each other, determining that there is a failure in the cloud streaming server.

A cloud streaming server test system according to this invention includes cloud streaming servers configured to transmit test results corresponding to a common test script key input corresponding to a common screen for testing a failure; and a test apparatus configured to compare a reference result image, corresponding to the common screen, with one or more of test result images created by capturing test result videos corresponding to the cloud streaming servers, and to determine whether at least one of the cloud streaming servers has a failure.

In testing whether a server that provides a cloud streaming service operates normally, this invention has an advantage of easily detecting a failure of a cloud streaming server, by including at least one virtual client module having, at least partially, the same function as an actual client terminal, by receiving a predetermined test result from at least one cloud streaming server through at least one virtual client module and then outputting the received result on a screen, by capturing an result image outputted from the at least one virtual client module, by comparing the captured result image with a predetermined reference image, and by determining, based on whether both images are identical, whether the cloud streaming server operates normally.

Additionally, this invention has an advantage of preventing in advance an error in data transmission of a cloud streaming server, by determining, as mentioned above, whether the server operates normally.

Additionally, this invention has an advantage of enhancing a service quality, by detecting in advance a failure of a server that provides a cloud streaming service, and thereby offering a stable cloud streaming service.

Additionally, this invention can prevent an error in a test result, such as reporting that a normally operating service screen is a failure, by masking an animation effect part of a test result video and then capturing and comparing result screens.

Additionally, this invention can prevent the propagation of a test result error in case of failure in a reference server, by changing properly the reference server for a cloud streaming server test.

Additionally, this invention can test both an operation error and a connection error of a cloud streaming server, by detecting the connection error of the cloud streaming server simultaneously with detecting a failure of the cloud streaming server through comparison of test result screens received from a plurality of cloud streaming servers.

Additionally, this invention can prevent an error in a test result due to a screen capture at an improper timing, by capturing and comparing test result screens after an execution result screen enters into a steady state after the transmission of a key script input.

Additionally, this invention can enhance the efficiency of a cloud streaming server test and also minimize a test error, by enabling two or more applications to create a common screen and transmitting, to a cloud streaming server, a common test script key input for creating an execution result screen from which animation is excluded.

DETAILED DESCRIPTION

Figure 1:
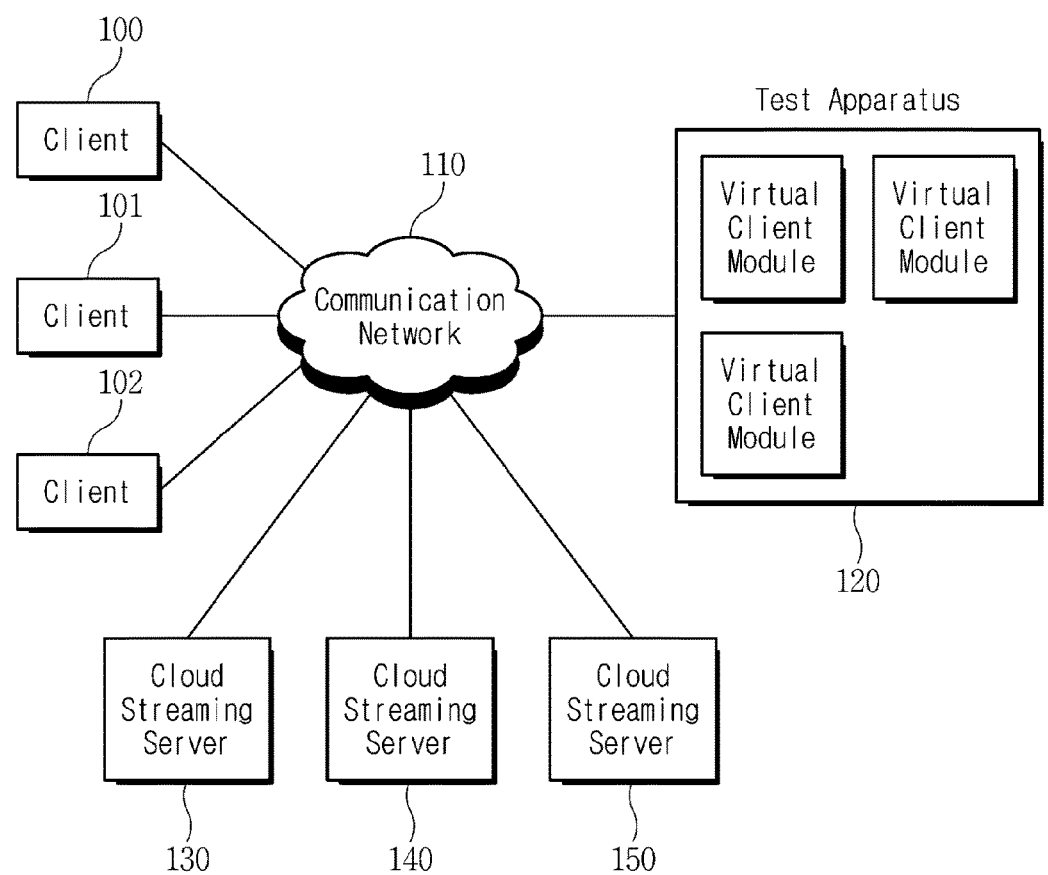
FIG. 1 is a diagram illustrating a test system for a cloud streaming server according to an embodiment of the present invention.

Hereinafter, preferred embodiments of this invention will be described with reference to the accompanying drawings. However, in the following description and accompanying drawings, well known functions or elements may not be described or illustrated in detail to avoid obscuring the subject matter of this invention. Through the drawings, the same reference numerals denote corresponding elements if possible.

The terms and words used in the following description and claims are not limited to the bibliographical meanings and are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

Now, with reference to embodiments, test technique capable of preventing the degradation of a service quality due to a server failure by detecting in advance whether a cloud streaming server operates normally or not will be described.

FIG. 1 is a diagram illustrating a test system for a cloud streaming server according to an embodiment of the present invention.

Referring to FIG. 1, a cloud streaming system to which this invention is applied includes a plurality of clients 100, 101 and 102, connected to each other via a communication network 110, and a plurality of cloud streaming servers 130, 140 and 150. In order to test whether this cloud streaming system operates normally, the present invention further includes a test apparatus 120 having virtual client modules which are connected with the plurality of cloud streaming servers 130, 140 and 150 and perform at least some functions of the clients 100, 101 and 102.

Although the following embodiments illustrate three cloud streaming servers 130, 140 and 150 and the test apparatus 120 having three virtual client modules, the number of the cloud streaming servers and the number of the virtual client modules are not limited thereto and may alternatively have various combinations depending on a need and design.

The above-mentioned client 100, 101 or 102 refers to a terminal capable of transmitting and receiving various kinds of data via the communication network 110, especially, means a user's device for providing a cloud streaming service by accessing the cloud streaming server 130, 140 or 150. For example, the client 100, 101 or 102 may be one of a tablet PC, a laptop, a personal computer (PC), a smart phone, a personal digital assistant (PDA), a smart TV, a mobile communication terminal, and a set-top box.

Additionally, the client 100, 101 or 102 refers to a terminal that has a browser for communicating with the cloud streaming server 130, 140 or 150 via the communication network 110, a memory for storing a program and a protocol, a microprocessor for executing and controlling various kinds of programs, and the like. Namely, any terminal capable of communicating with the cloud streaming server 130, 140 or 150 may be used as the client 100, 101 or 102, including any communication computing apparatus such as a notebook computer, a mobile communication device, a PDA, and the like.

The client 100, 101 or 102 may not only, for example, access the cloud streaming server 130, 140 or 150 and request a specific service or function in response to a user input, but also receive, from the cloud streaming server 130, 140 or 150, and output a result screen according to the execution of the requested service or function.

Additionally, the cloud streaming server 130, 140 or 150 is an element for providing a specific service or function, especially a cloud streaming service, to a plurality of clients 100, 101 and 102. For example, in order to provide a certain service or function, e.g., a service or function requiring a highly efficient image processing, regardless of an OS type, CPU performance, memory capacity, or other software and hardware specifications of the client 100, 101 or 102, the cloud streaming server 130, 140 or 150 may perform a service or function in response to a user input received from the client 100, 101 or 102 and then transmit a result screen to the client 100, 101 or 102. For this, the cloud streaming server 130, 140 or 150 may have a screen virtualization function. Particularly, in order to test a normal operation or not (i.e., a failure or not), the cloud streaming server 130, 140 or 150 may receive a predetermined test script key input and transmit a test result (a test result screen), created on the basis of the received input, to the respective virtual client modules of the test apparatus 120.

The communication network 110 refers to a network, such as internet, intranet, mobile communication network, satellite communication network, and the like, capable of transmitting and receiving data through internet protocol by using various wired/wireless communication techniques. The communication network 110 refers to a closed-type network such as a local area network (LAN) or a wide area network (WAN), an open-type network such as internet, a network such as a code division multiple access (CDMA), a wideband code division multiple access (WCDMA), a global system for mobile communications (GSM), a long term evolution (LTE), or an evolved packet core (EPC), a next-generation network to be realized in the future, and a computing network.

The test apparatus 120 is a device for testing whether the cloud streaming server 130, 140 or 150 operates normally. The test apparatus 120 includes at least one virtual client module having at least some functions of the client 100, 101 or 102.

When at least one of the virtual client modules receives a test result from at least one of the cloud streaming servers 130, 140 and 150, processes the received test result, and outputs a result image on a screen, the test apparatus 120 captures the outputted result image, compares the captured result image with a predetermined reference result image, and then determines a failure or not of the at least one cloud streaming server depending on whether both images are identical or not. Specifically, when the at least one virtual client module performs data processing such as decoding for a test result received from the specific cloud streaming server 130 and then outputs a result image on the screen, the test apparatus 120 compares the result image being outputted at a capture time with the predetermined reference result image (which may correspond to one of the cloud streaming servers which are test targets). If both images are not identical, the test apparatus 120 determines that the cloud streaming server 130 operates abnormally due to any failure. If both images are identical, the test apparatus 120 determines that the cloud streaming server 130 operates normally. The test apparatus 120 may create a masked video by masking a test result video before capturing the result image, and then create the result image by capturing the masked video. In this case, a capture time may be set on the basis of a time point when a test result is transmitted from at least one of the cloud streaming servers 130, 140 and 150, and may be previously stored in the test apparatus 120.

Particularly, such capturing may be performed after a steady state condition of the test result video is satisfied. Namely, after a test key script input is transmitted to the cloud streaming servers 130, 140 and 150, the time required for creating the final test result screens may be varied depending on the time required for transmission of the key script input or the operating speed of the cloud streaming servers 130, 140 and 150. Thus, in order to obtain errorless test results, it is needed to capture the test result screens when normal state result screens are transmitted from all the cloud streaming servers 130, 140 and 150 after a sufficient time elapses.

At this time, the test apparatus 120 may transmit a common test script key input corresponding to a common screen to the cloud streaming servers 130, 140 and 150, and then receive test results corresponding to the common test script key input from the cloud streaming servers 130, 140 and 150. In this case, the common test script key input may enable two or more different applications to create the same common screen. This common screen may be a screen from which any animation effect is excluded.

Like this, a test performed using the common test script key input may remove a possibility of causing errors to test results due to an animation and the like. Also, since the same key stroke can be applied equally to several applications, it is possible to perform an efficient test.

For example, the test apparatus 120 may create a masked video by masking a part, having an animation effect and being varied regardless of a key input, of test result videos created by the cloud streaming servers 130, 140 and 150, and then determine a failure of at least one of the cloud steaming servers 130, 140 and 150 by comparing test result images obtained by capturing the masked videos. If it is determined that a change of the reference server 130 is needed (if a change condition is satisfied), the reference server 130 may be changed to another server 140 or 150.

For example, the test apparatus 120 may compare a test result image, created by capturing a test result video corresponding to the reference server 130 which is one of the cloud streaming servers 130, 140 and 150, with test result images created by capturing test result videos corresponding to the other cloud streaming servers 140 and 150, and then determine a failure of at least one of the cloud streaming servers 130, 140 and 150. If it is determined that a change of the reference server 130 is needed (if a change condition is satisfied), the reference server 130 may be changed to another server 140 or 150.

For example, the test apparatus 120 may compare a test result image, created by capturing a test result video, after the satisfaction of a steady state condition, corresponding to the reference server 130 which is one of the cloud streaming servers 130, 140 and 150, with test result images created by capturing test result videos, after the satisfaction of a steady state condition, corresponding to the other cloud streaming servers 140 and 150, and then determine a failure of at least one of the cloud streaming servers 130, 140 and 150. If it is determined that a change of the reference server 130 is needed (if a change condition is satisfied), the reference server 130 may be changed to another server 140 or 150.

In this case, the steady state condition may be an elapse condition of a predetermined time which is determined according to the predetermined test script key input.

In this case, whether the elapse condition is satisfied or not may be determined depending on whether the predetermined time elapses from the timing when the predetermined test script key input is transmitted.

In this case, the steady state condition may be determined differently depending on the predetermined test script key input. Namely, if any test key input takes longer, the steady state condition may be varied according to a longer input process.

In this case, the change condition may indicate that the number of cloud streaming servers determined as having a failure among the cloud streaming servers is greater than a predetermined reference value.

The test apparatus 120 may detect an error of a connection with the cloud streaming servers 130, 140 and 150. For example, the test apparatus 120 may regard as a connection error if a failure in trying a connection with the cloud streaming servers 130, 140 and 150 is received or if no test result is received from the cloud streaming servers 130, 140 and 150 for a predetermined time or more. Namely, if the client module tries to connect with the cloud streaming server but fails in connection, or if no cloud streaming service screen is transmitted from the cloud streaming server, the test apparatus 120 may notify a connection error separately from a test by means of a screen comparison.

The test apparatus 120 may create a masked video by masking a part having an animation effect in the test result video and then perform a comparison for a test result image created by capturing the masked video.

Like this, when at least one virtual client module receives test results from the respective different cloud streaming servers, this invention compares a result image outputted from the virtual client module with a reference result image and then determines, based on a comparison result, whether the cloud streaming server operates normally. Namely, based on a screen image offered actually to a user by the client 100, 101 or 102, this invention determines whether each of the cloud streaming servers 130, 140 and 150 operates normally. However, when compared, an animation part that may cause different results depending on a capture time even for the same input is masked. For this, the test apparatus 120 may simultaneously request at least one of the cloud streaming servers 130, 140 and 150 to transmit a test result, and each of the cloud streaming servers 130, 140 and 150 may transmit the test result in response to this request signal. Further, the virtual client module that receives a test result from the at least one cloud streaming server 130, 140 or 150 and processes the test result may be predetermined. Namely, at least one cloud streaming server 130, 140 or 150 and at least one virtual client module may have a one-to-one or many-to-one mapping relation. Thus, when requesting the at least one cloud streaming server 130, 140 or 150 to send a test result, the test apparatus 120 may also transmit information about the virtual client module to receive the test result. Further, when the virtual client module is mapped to two or more cloud streaming servers, the test apparatus may adjust a time point of requesting a test result transmission of at least one cloud streaming server 130, 140 or 150 so as to sequentially receive test results from two or more cloud streaming servers 130, 140 and 150.

Now, in the above-discussed system, the test apparatus 120 according to an embodiment of this invention will be described in detail with reference to FIGS. 2 and 3.

Figure 2:
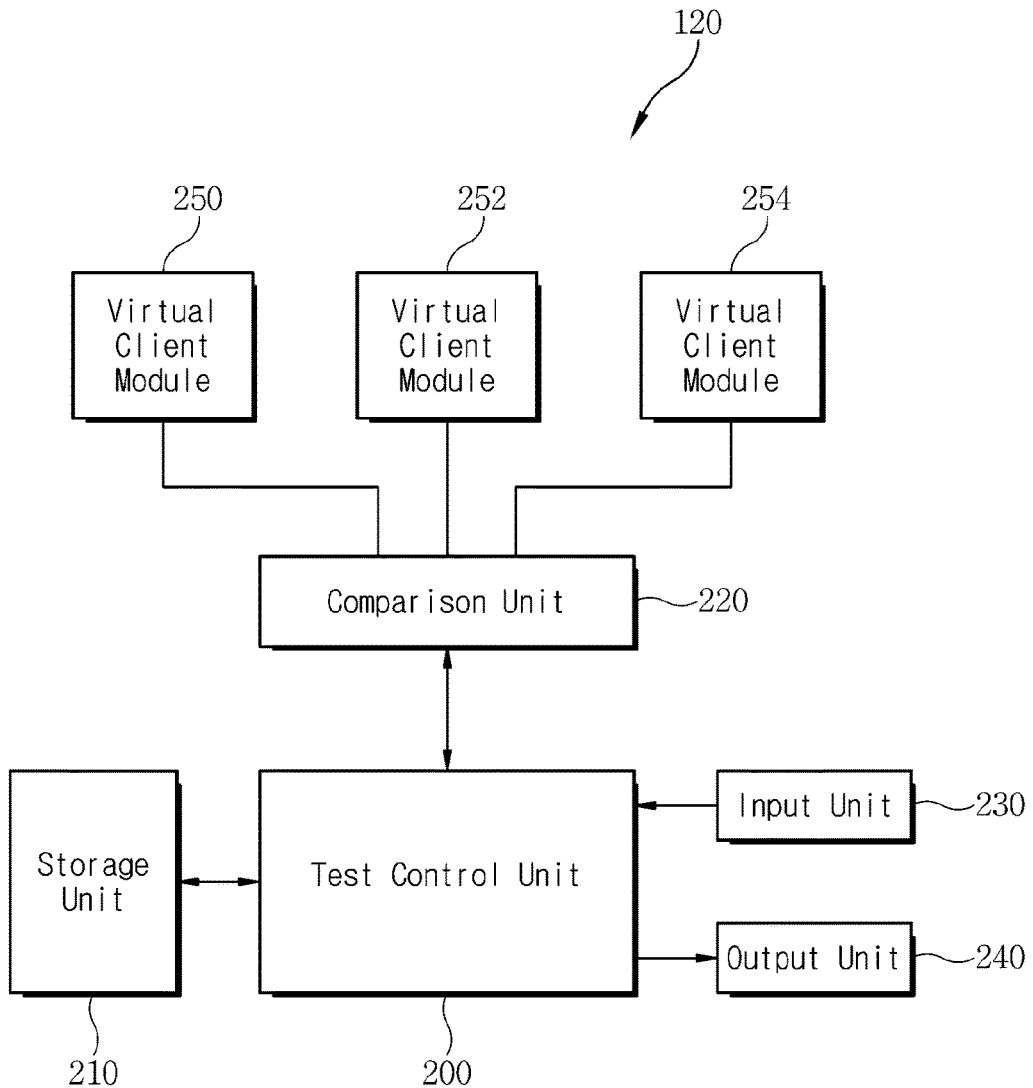
FIG. 2 is a diagram illustrating a cloud streaming server test apparatus according to an embodiment of the present invention.

First, referring to FIG. 2, the test apparatus 120 may be configured to include a test control unit 200, a storage unit 210, a comparison unit 220, an input unit 230, an output unit 240, and at least one client module 250, 252 or 254. Although three virtual client modules 250, 252 and 254 are exemplarily shown in this embodiment, the number of the virtual client modules 250, 252 and 254 may be varied depending on a system operation.

The test control unit 200 performs the whole control required for determining whether there is a failure of the cloud streaming servers 130, 140 and 150. When it is requested to determine a failure, the test control unit 200 determines a failure or not of the cloud streaming server, based on a comparison result obtained through the comparison unit 220, namely, depending on whether a result image created by capturing an output screen of a test result is identical with a predetermined reference result image. In this case, a time point of a request for determination of a failure may be a time point when a test result is completely received from the virtual client module 250, 252 or 254, a time point when there is an input of a request for determination of a failure through the input unit 230, or a predetermined periodic time point. Namely, a request for determination of a failure may depend on setting. Additionally, the reference result image may be stored in advance, or a result image outputted from a specific virtual client module among the at least one virtual client modules 250, 252 and 254 may be defined as the reference result image.

Particularly, the test control unit 200 changes the reference server to another cloud streaming server when a change condition of the reference server is satisfied. Namely, if any failure occur at the reference server, a test based on this reference server may produce a wrong test result that normally operating servers have a failure. A proper change of the reference server may prevent this undesirable case.

Meanwhile, if compared two images are identical with each other, the test control unit 200 determines that the cloud streaming server has no failure. If two images are not identical, the test control unit 200 determines that the cloud streaming server has a failure.

Additionally, if the number of cloud streaming servers determined as having failures before changing the reference server is greater, by a predetermined number or more, than the number of cloud streaming servers determined as having failures after changing the reference server, the test control unit 200 may determine that there is a failure in the reference server before changed.

The storage unit 210 may store information required for the operation of the test apparatus 120. The storage unit 210 stores information about a capture time point for capturing, at the same time, result videos for test results transmitted from at least one cloud streaming server 130, 140 or 150. The capture time point may be after a steady state condition is satisfied for all the cloud streaming servers. Further, the storage unit 210 may store basic information about a test result transmitted from the cloud streaming servers. Particularly, the storage unit 210 may store in advance a reference image of a specific time point to be used for determining a failure or not of the cloud streaming server. The storage unit 210 may include a magnetic media such as a hard disk, a floppy disk or a magnetic tape, an optical media such as a compact disk read only memory (CD-ROM) or a digital video disk (DVD), a magneto-optical media such as a floptical disk, a ROM, a random access memory (RAM), and a flash memory.

The comparison unit 220 may request, under the control of the test control unit 200, a delivery of a test result video received at each of the virtual client modules 250, 252 and 254 and then outputted as a screen. Additionally, the comparison unit 220 creates a masked video by masking a part having animation in the test result video, creates a test result image by capturing the masked video, compares the created test result image with a reference result image, and outputs a comparison result to the test control unit 200. For this, the comparison unit 220 may further perform a process of setting the reference result image. Namely, the comparison unit 220 may compare a test result image, created by capturing a masked video corresponding to the reference server which is one of the cloud streaming servers, with test result images created by capturing test result videos corresponding to other cloud streaming servers.

In this case, the test result images corresponding to other cloud streaming servers may be captured at the same time point as the test result image corresponding to the reference server. This capture time point may be after a steady state condition is satisfied for all the cloud streaming servers.

The input unit 230 may create a user input signal corresponding to a request or information of a cloud streaming server manager depending on such manager's manipulations. The input unit 230 may be implemented by various input mechanisms which are currently commercialized or expected to be commercialized, including, for example, a normal input device such as a keyboard, a mouse, a joystick, a touch screen, a touch pad, etc., and a gesture input device which detects a user's motion and thereby creates a specific input signal.

The output unit 240 is a device for allowing a user to perceive an operation result or state of the test apparatus 120, including, for example, a display unit for offering a visual output onto a screen, a speaker for outputting an audible sound, and the like. Particularly, in this invention, the output unit 240 may output visually a result image processed and outputted from the at least one virtual client module 250, 252 or 254, compare the result image with the reference result image, output a comparison result, and display a failure or not of the cloud streaming server.

The virtual client module 250, 252 or 254, which virtualizes the client 100, 101 or 102 that accesses the cloud streaming server 130, 140 or 150 and is offered a cloud streaming service, may actually perform at least some functions of the client 100, 101 or 102. For example, the virtual client module 250, 252 or 254 may access a specific one of the cloud streaming servers 130, 140 and 150, receive a test result from the specific cloud streaming server 130, 140 or 150, create a test result video by performing the same processing (e.g., decoding) with regard to the received test result as the client 100, 101 or 102 performs, and output the created test result video on the screen through the output unit 240. Also, in response to a request for a result image from the comparison unit 220, the virtual client module 250, 252 or 254 may capture the result image outputted on the screen at a specific time point and then deliver it to the comparison unit 220. Information about the capture time point may be received from the comparison unit 220 or previously set and stored. Capturing the result image may be performed, for example, in a manner of capturing image data stored in a frame buffer of the virtual client module 250, 252 or 254. In another embodiment, capturing the test result video and creating the test result image may be alternatively performed at the comparison unit 220.

Namely, the virtual client module 250, 252 or 254 offers a test script key input to the cloud streaming server, receives a test result corresponding to the test script key input from the cloud streaming server, and creates a test result video by decoding the test result. In this case, the test result may be an encoded streaming video, and the test result video may be a decoded streaming video.

Particularly, the virtual client modules 250, 252 and 254 may transmit a common test script key input corresponding to a common screen to the cloud streaming servers 130, 140 and 150, receive test results corresponding to the common test key input from the cloud streaming servers 130, 140 and 150, and create test result videos.

In this case, the common test script key input may allow two or more different applications to create the common screen.

In this case, the common screen may be a screen from which any animation effect is excluded.

Namely, by using the common test script key input, a plurality of applications may share the test script key input and further share the reference result image. Additionally, by using the common key script key input for creating the common screen from which an animation effect is excluded, any error of test results may be prevented.

Figure 3:
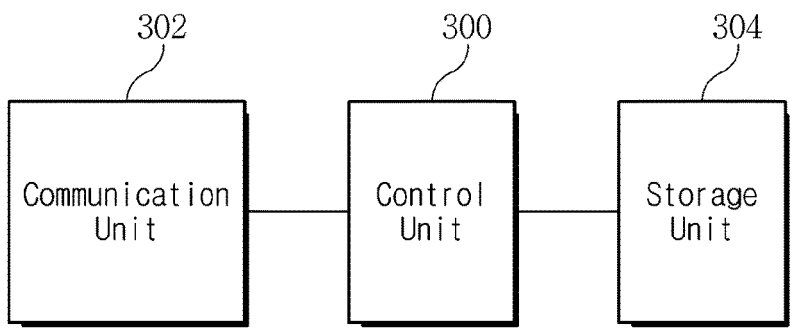
FIG. 3 is a diagram illustrating the configuration of a virtual client module for receiving and processing a test result according to an embodiment of the present invention.

The internal configuration of the virtual client module 250, 252 or 254 is as shown in FIG. 3. Since the respective virtual client modules 250, 252 and 254 have the same configuration, the following description about FIG. 3 will use exemplarily the virtual client module 250.

FIG. 3 is a diagram illustrating the configuration of a virtual client module for receiving and processing a test result according to an embodiment of the present invention.

Referring to FIG. 3, the virtual client module 250 may be configured to include a control unit 300, a communication unit 302, and a storage unit 304.

The virtual client module 250 may be implemented by virtualizing a terminal device, e.g., one of a tablet PC, a laptop, a personal computer (PC), a smart phone, a personal digital assistant (PDA), a smart TV, a mobile communication terminal, and a set-top box, capable of receiving data provided from the cloud streaming server 130, 140 or 150. Therefore, depending on types of a terminal device, the virtual client module 250 may have different configurations. Particularly, in this invention, the virtual client module 250 may be implemented for performing further functions of receiving a test result, decoding the received test result, creating a test result video, and outputting a screen.

The control unit 300 performs the whole control of the virtual client module 250. Particularly, in response to a request from the comparison unit 220 or a test unit 820 to the cloud streaming server 130, 140 or 150, the control unit 300 extracts a result image outputted on the screen at a specific time point and then delivers it to the comparison unit 220 or the test unit 820. Further, the control unit 300 may transmit a test result transmission request signal to the specific cloud streaming server 130, 140 or 150 via the communication unit 302. When sending the test result transmission request signal, the control unit 300 may also send identification information of the virtual client module that will receive a test result. Also, based on a test schedule of a plurality of cloud streaming servers, the control unit 300 may sequentially transmit the test result transmission request signal for each cloud streaming server.

The communication unit 302 receives a test result from the cloud streaming server 130, 140 or 150 through the communication network 110. The communication unit 302 may transmit and receive data in various manners of communication as well as in a wired or wireless manner. Further, the communication unit 302 may transmit and receive data by using one or more communication schemes. For this, the communication unit 302 may include a plurality of communication modules for transmitting and receiving data based on different communication schemes.

The storage unit 304 stores information required for the operation of the virtual client module 250. Particularly, the storage unit 304 may store test results received from the cloud streaming servers 130, 140 and 150. Further, the storage unit 302 may store test result videos which are outputted on the screen by performing data processing for the received test results, and store in advance, depending on settings, information about a capture time point of the result image. The storage unit 304 may include a magnetic media such as a hard disk, a floppy disk or a magnetic tape, an optical media such as a compact disk read only memory (CD-ROM) or a digital video disk (DVD), a magneto-optical media such as a floptical disk, a ROM, a random access memory (RAM), and a flash memory.

Figure 4:
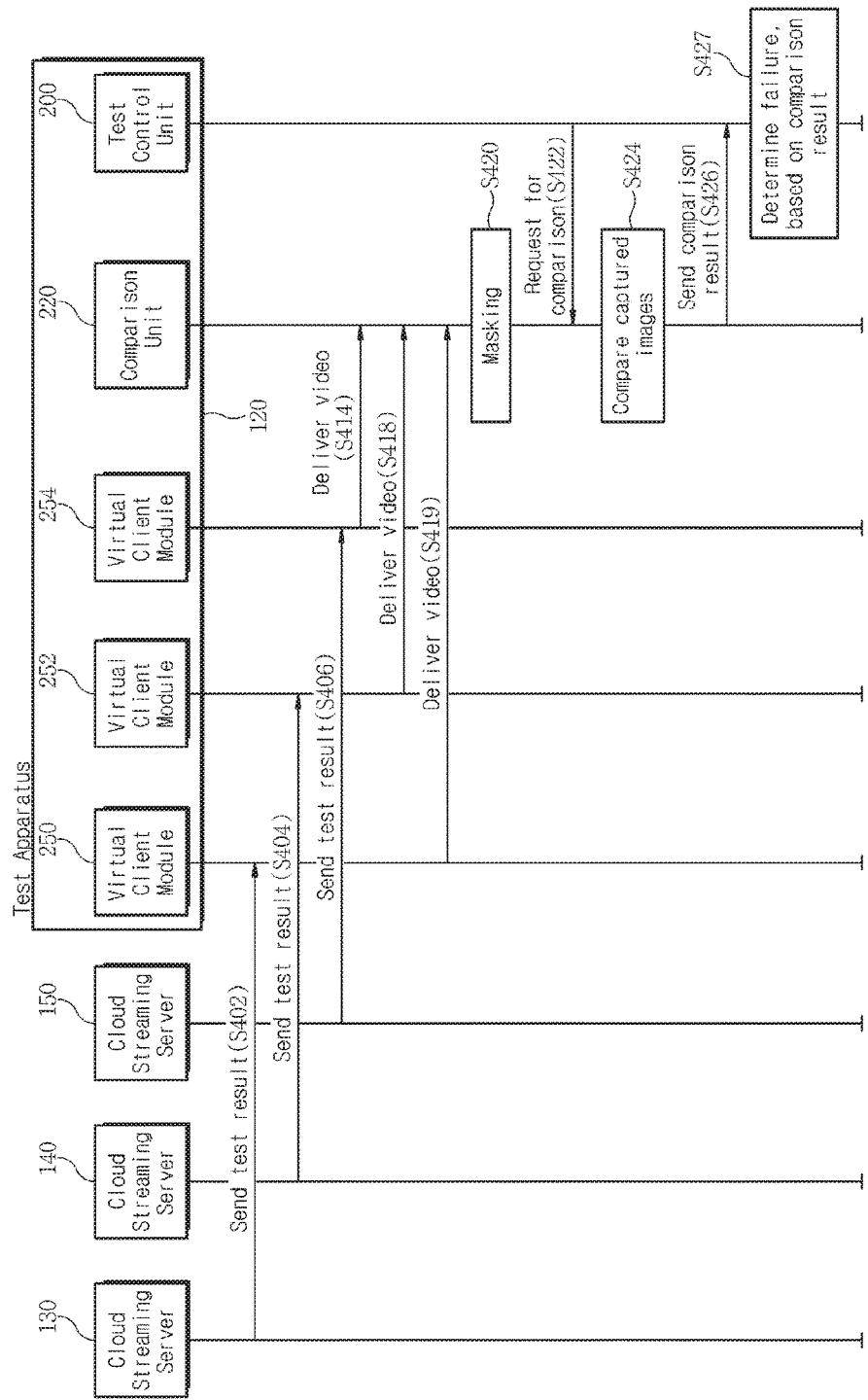
FIG. 4 is a flow diagram illustrating a test process at a test system for a cloud streaming server according to an embodiment of the present invention.

FIG. 4 is a flow diagram illustrating a process of testing whether a cloud streaming server operates normally, at a test system according to an embodiment of the present invention.

The cloud streaming servers 130, 140 and 150 transmit simultaneously test results to the virtual client modules 250, 252 and 254 of the test apparatus 120 (steps S402 to S406). Namely, one client streaming server 130 may send a test result to the virtual client module 250, another cloud streaming server 140 may send a test result to the virtual client module 252, and the other cloud streaming server 150 may send a test result to the virtual client module 254. Contrary to this, one virtual client module may receive sequentially, at intervals, test results from a plurality of cloud streaming servers 130, 140 and 150.

In this case, the cloud streaming server 130, 140 or 150 may transmit a test result in response to a test script key input of the virtual client module 250, 252 or 254.

Each of the virtual client modules 250, 252 and 254 creates a test result video by decoding the test result received from the cloud streaming server 130, 140 or 150, and offers the created video to the comparison unit 220 (steps S414 to S419). At these steps, offering the test result video may be performed in response to a test request from the test control unit 200. Additionally, the comparison unit 220 may request each of the virtual client modules 250, 252 and 254 to deliver the test result received from the cloud streaming server 130, 140 or 150. At this time, the virtual client module 250, 252 or 254 may create the test result video by processing the received test result as if the client 100, 101 or 102 actually does, and then output the created video on the screen. At this time, the virtual client module 250, 252 or 254 may capture an operating case video being outputted to the screen at a time point requested by the comparison unit 220 or at a predetermined specific time point and then transmit the captured video to the comparison unit 220. Namely, capturing the operating case video and creating an operating case image may be performed by the virtual client module 250 or the comparison unit 220.

The comparison unit 220 creates a masked video by masking a part, to which animation is applied, in each of the received test result videos (step S420).

At this step, the part to which animation is applied is a part which varies regardless of a key input and may be a part into which a movable object, an object having a variable size, shape, color, etc., or the like is inserted. Also, this part may be a clock-displayed portion.

The comparison unit 220 compares a test result image, created by capturing each masked video, with a predetermined reference result image, and then delivers a comparison result to the test control unit 200 (steps S424 and S426). Here, the reference result image may be a pre-stored result image which will appear when the test result is normally transmitted and outputted. Alternatively, the result image outputted from a predetermined specific one of the virtual client modules 250, 252 and 254 may be set as the reference result image. For this, before performing comparison, the comparison unit 220 may further perform a step of setting the reference result image.

Then the test control unit 200 determines, based on a comparison result, whether the cloud streaming server has a failure. As the result of comparison, if the result image captured from the received test result is not identical with the predetermined reference result image, the test control unit 200 determines that there is a failure in the cloud streaming server (step S427). At this step, if identical, the test control unit 200 determines that there is no failure in the cloud streaming server. At this time, the comparison result is delivered to the test control unit 200 with regard to each of the cloud streaming servers 130, 140 and 150, and then, based on the comparison result, the test control unit 200 may determine whether each cloud streaming server has a failure.

Figure 5:
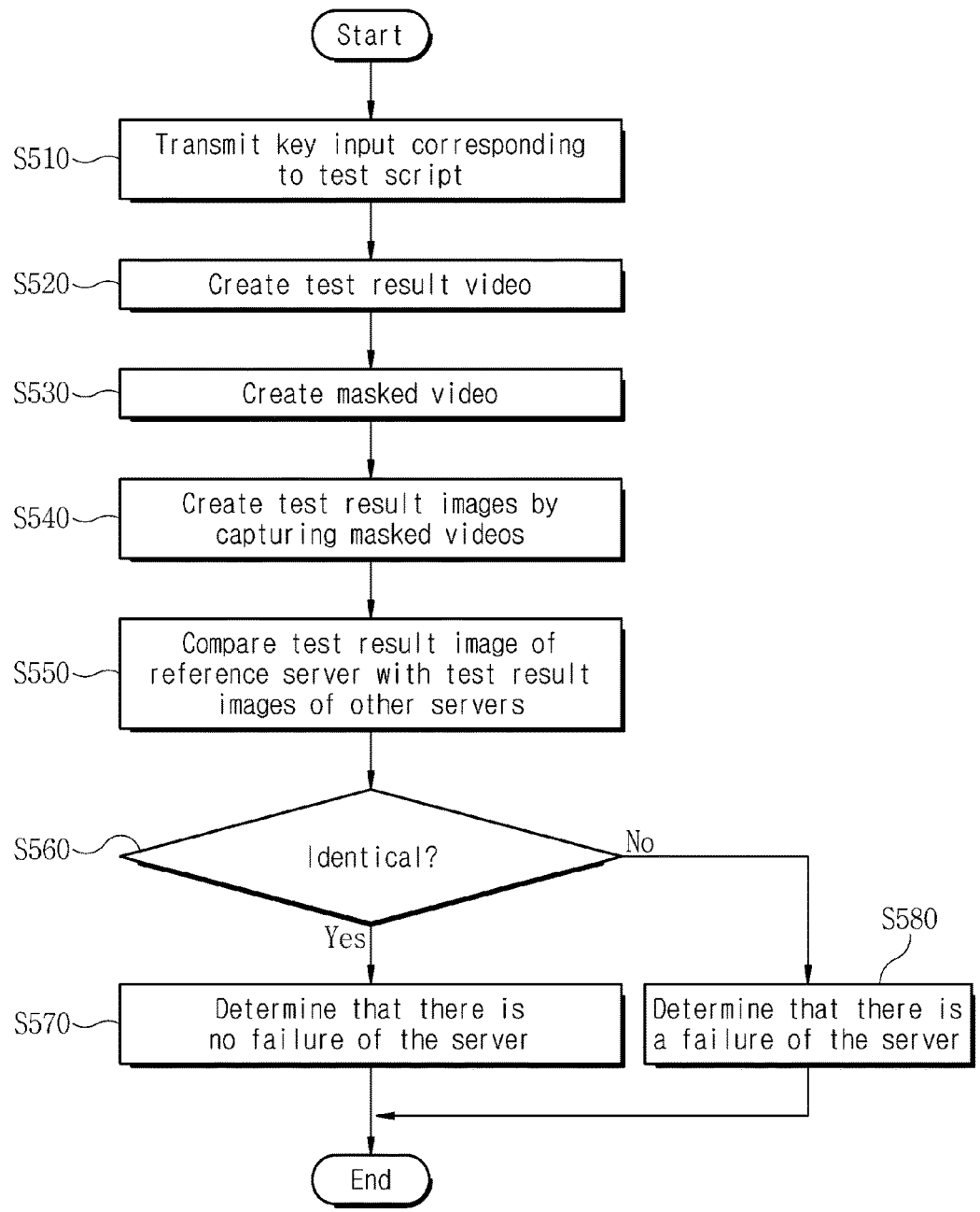
FIG. 5 is a flow diagram illustrating a method for testing a cloud streaming server according to an embodiment of the present invention.

FIG. 5 is a flow diagram illustrating a method for testing, at the test apparatus 120, whether the cloud streaming server 130, 140 or 150 operates normally according to an embodiment of the present invention.

Referring to FIG. 5, in the cloud streaming server test method according to an embodiment of this invention, the virtual client modules transmit a key input corresponding to a test script to the cloud streaming servers (step S510), and the virtual client modules receive test results from the cloud streaming servers and then create test result videos (step S520).

Additionally, in the cloud streaming server test method according to an embodiment of this invention, the test apparatus creates a masked video by masking a part, to which an animation effect is applied, in the test result videos (step S530).

Additionally, in the cloud streaming server test method according to an embodiment of this invention, the test apparatus creates test result images by capturing the masked videos (step S540).

At this time, the test result images corresponding to the cloud streaming servers may be captured at the same time point as the test result image corresponding to the reference server.

Also, step S540 may be performed by the virtual client modules 250, 252 and 254 shown in FIG. 2 or by the comparison unit 220.

Additionally, in the cloud streaming server test method according to an embodiment of this invention, the test apparatus compares the test result image of the reference server with the test result image of other cloud streaming servers, and thereby determines whether compared images are identical with each other (steps S550 and S560).

If the compared images are identical, the test apparatus in the cloud streaming server test method according to an embodiment of this invention determines that there is no failure in the cloud streaming server (step S570).

If the compared images are not identical, the test apparatus in the cloud streaming server test method according to an embodiment of this invention determines that there is any failure in the cloud streaming server (step S580).

Figure 6:
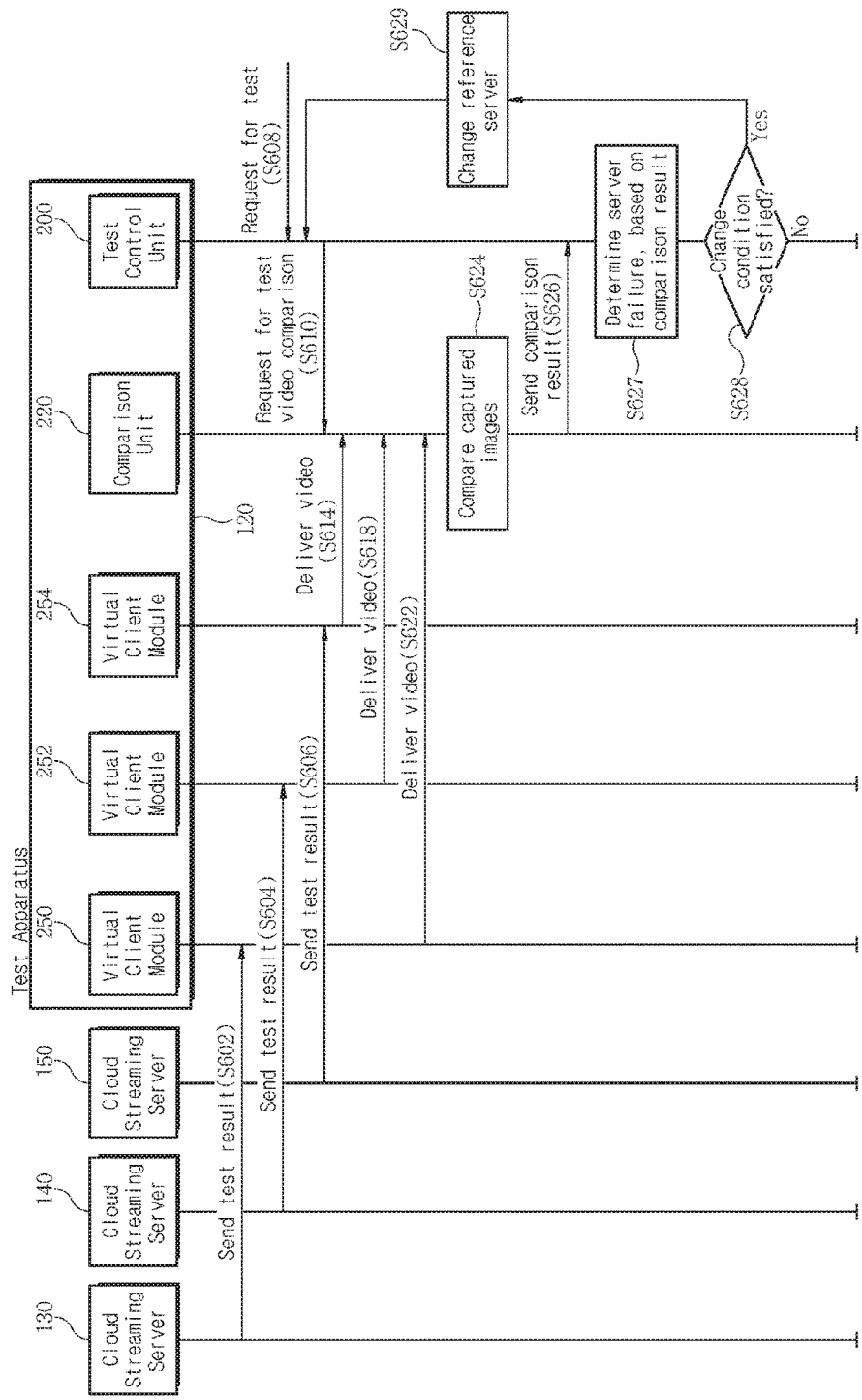
FIG. 6 is a flow diagram illustrating a test process at a test system for a cloud streaming server according to an embodiment of the present invention.

FIG. 6 is a flow diagram illustrating a process of testing whether a cloud streaming server operates normally, at a test system according to an embodiment of the present invention.

The cloud streaming servers 130, 140 and 150 transmit simultaneously test results to the virtual client modules 250, 252 and 254 of the test apparatus 120 (steps S602 to S606). Namely, one client streaming server 130 may send a test result to the virtual client module 250, another cloud streaming server 140 may send a test result to the virtual client module 252, and the other cloud streaming server 150 may send a test result to the virtual client module 254. Contrary to this, one virtual client module may receive sequentially, at intervals, test results from a plurality of cloud streaming servers 130, 140 and 150.

In this case, the cloud streaming server 130, 140 or 150 may transmit a test result in response to a test script key input of the virtual client module 250, 252 or 254.

The test control unit 200 of the test apparatus 120 which receives the test results requests the comparison using test result images obtained by capturing test result videos in response to a test request (steps S608 and S610).

The comparison unit 220 of the test apparatus 120 may request each of the virtual client modules 250, 253 and 254 to deliver the test results received from the cloud streaming server 130, 140 or 150.

Each of the virtual client modules 250, 252 and 254 delivers the received test result to the comparison unit 220 (steps S614, S618 and S622). At this time, the virtual client module 250, 252 or 254 may create the test result video by processing the received test result as if the client 100, 101 or 102 actually does, and then output the created video on the screen. At this time, the virtual client module 250, 252 or 254 may capture a test result video being outputted to the screen at a time point requested by the comparison unit 220 or at a predetermined specific time point and then transmit the captured video to the comparison unit 220. Namely, capturing the test result video and creating the test result image may be performed by the virtual client module 250, 252 or 254 or by the comparison unit 220.

Thereafter, the comparison unit 220 compares the test result image, created by capturing each received test result video, with a predetermined reference result image, and then delivers a comparison result to the test control unit 200 (steps S624 and S626). Here, the reference result image may be a pre-stored result image which will appear when the test result is normally transmitted and outputted. Alternatively, the result image outputted from a predetermined specific one of the virtual client modules 250, 252 and 254 may be set as the reference result image. For this, before performing comparison, the comparison unit 220 may further perform a step of setting the reference result image.

Then the test control unit 200 determines, based on a comparison result, whether the cloud streaming server has a failure. As the result of comparison, if the result image captured from the received test result is not identical with the predetermined reference result image, the test control unit 200 determines that there is a failure in the cloud streaming server (step S627). At this step, if identical, the test control unit 200 determines that there is no failure in the cloud streaming server. At this time, the comparison result is delivered to the test control unit 200 with regard to each of the cloud streaming servers 130, 140 and 150, and then, based on the comparison result, the test control unit 200 may determine whether each cloud streaming server has a failure.

Further, the test control unit 200 determines whether a reference server change condition is satisfied (step S628).

If it is determined that the change condition is satisfied, the test control unit 200 changes the reference server (step S629).

At this time, the change condition may indicate that the number of cloud streaming servers determined as having a failure is greater than a predetermined reference value. Namely, if too many failures are detected, this may be caused by a failure in the reference server. In this case, having to change the reference server may prevent a wrong test result.

Figure 7:
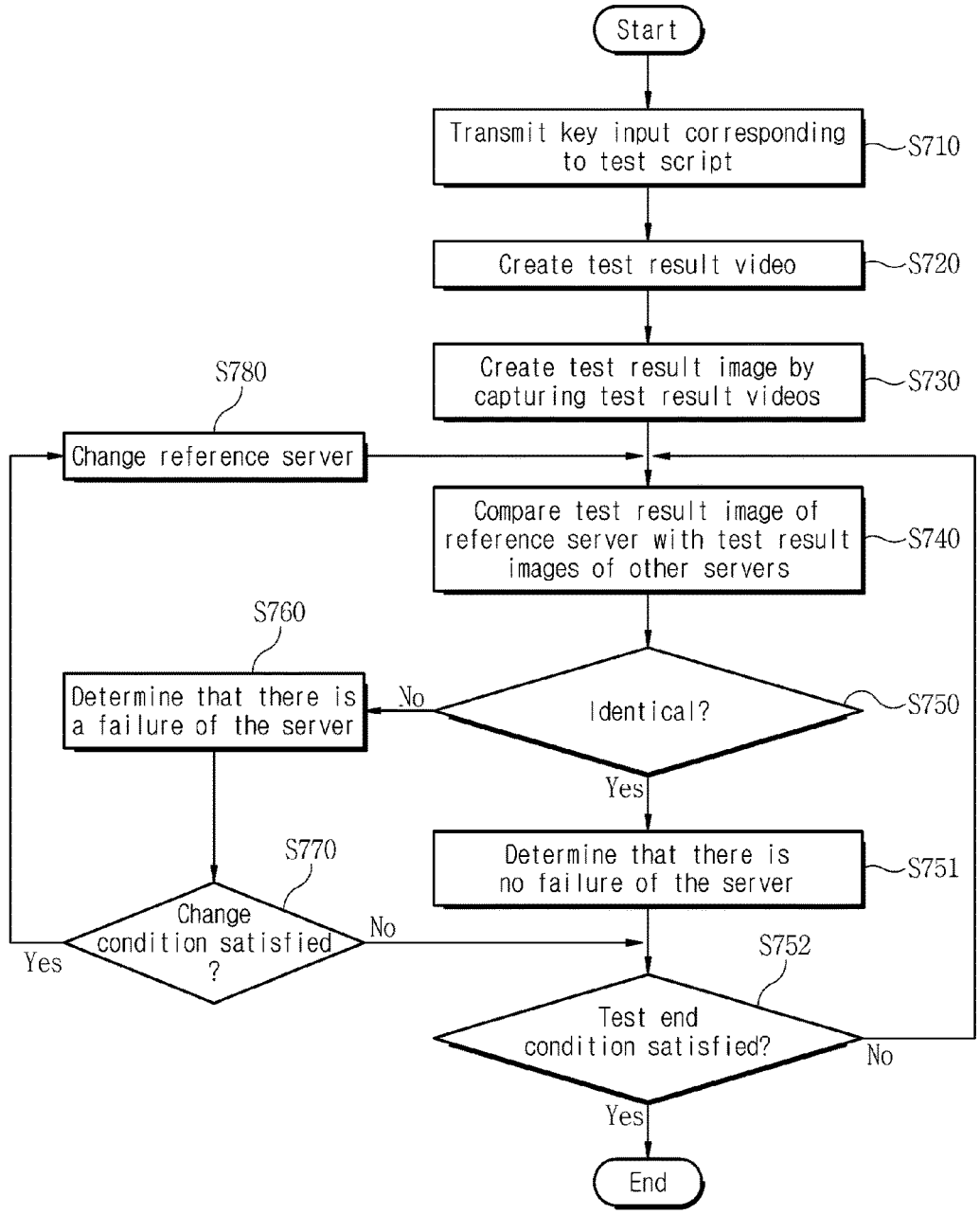
FIG. 7 is a flow diagram illustrating a method for changing a reference server for testing a cloud streaming server according to an embodiment of the present invention.

FIG. 7 is a flow diagram illustrating a reference server change method for testing, at the test apparatus 120, whether the cloud streaming server 130, 140 or 150 operates normally according to an embodiment of the present invention.

Referring to FIG. 7, in the reference server change method for testing the cloud streaming server according to an embodiment of this invention, the virtual client modules transmit a key input corresponding to a test script to the cloud streaming servers (step S710).

Additionally, in the reference server change method for testing the cloud streaming server according to an embodiment of this invention, the virtual client modules receive test results from the cloud streaming servers and then create test result videos (step S720).

Additionally, in the reference server change method for testing the cloud streaming server according to an embodiment of this invention, the test apparatus creates test result images by capturing the test result videos (step S730).

At this time, the test result images corresponding to the cloud streaming servers may be captured at the same time point as the test result image corresponding to the reference server.

Also, step S730 may be performed by the virtual client modules 250, 252 and 253 shown in FIG. 2 or by the comparison unit 220.

Additionally, in the reference server change method for testing the cloud streaming server according to an embodiment of this invention, the test apparatus compares the test result image of the reference server with the test result image of other cloud streaming servers, and thereby determines whether compared images are identical with each other (steps S740 and S750).

If the compared images are identical, the test apparatus in the reference server change method for testing the cloud streaming server according to an embodiment of this invention determines that there is no failure in the cloud streaming server (step S751).

If the compared images are not identical, the test apparatus in the reference server change method for testing the cloud streaming server according to an embodiment of this invention determines that there is any failure in the cloud streaming server (step S760).

Additionally, in the reference server change method for testing the cloud streaming server according to an embodiment of this invention, the test apparatus determines whether the reference server change condition is satisfied (step S770).

At this time, the change condition may indicate that the number of cloud streaming servers determined as having a failure is greater than a predetermined reference value.

As the result of determination at step S770, if it is determined that the reference server change condition is satisfied, the test apparatus in the reference server change method for testing the cloud streaming server according to an embodiment of this invention changes the reference server (step S780) and compares again the test result images (step S740).

In the reference server change method for testing the cloud streaming server according to an embodiment of this invention, the test apparatus determines whether a test termination condition is satisfied (step S752), and terminates the process when the test terminal condition is satisfied.

At this step, the test termination condition may be received from a user, or a condition that any failure below a predetermined level occurs during a predetermined period.

Although not shown in FIG. 7, if the number of cloud streaming servers determined as having failures before changing the reference server is greater, by a predetermined number or more, than the number of cloud streaming servers determined as having failures after changing the reference server, the reference server change method for testing the cloud streaming server according to an embodiment of this invention may further include step of determining that there is a failure in the reference server before changed.

Figure 8:
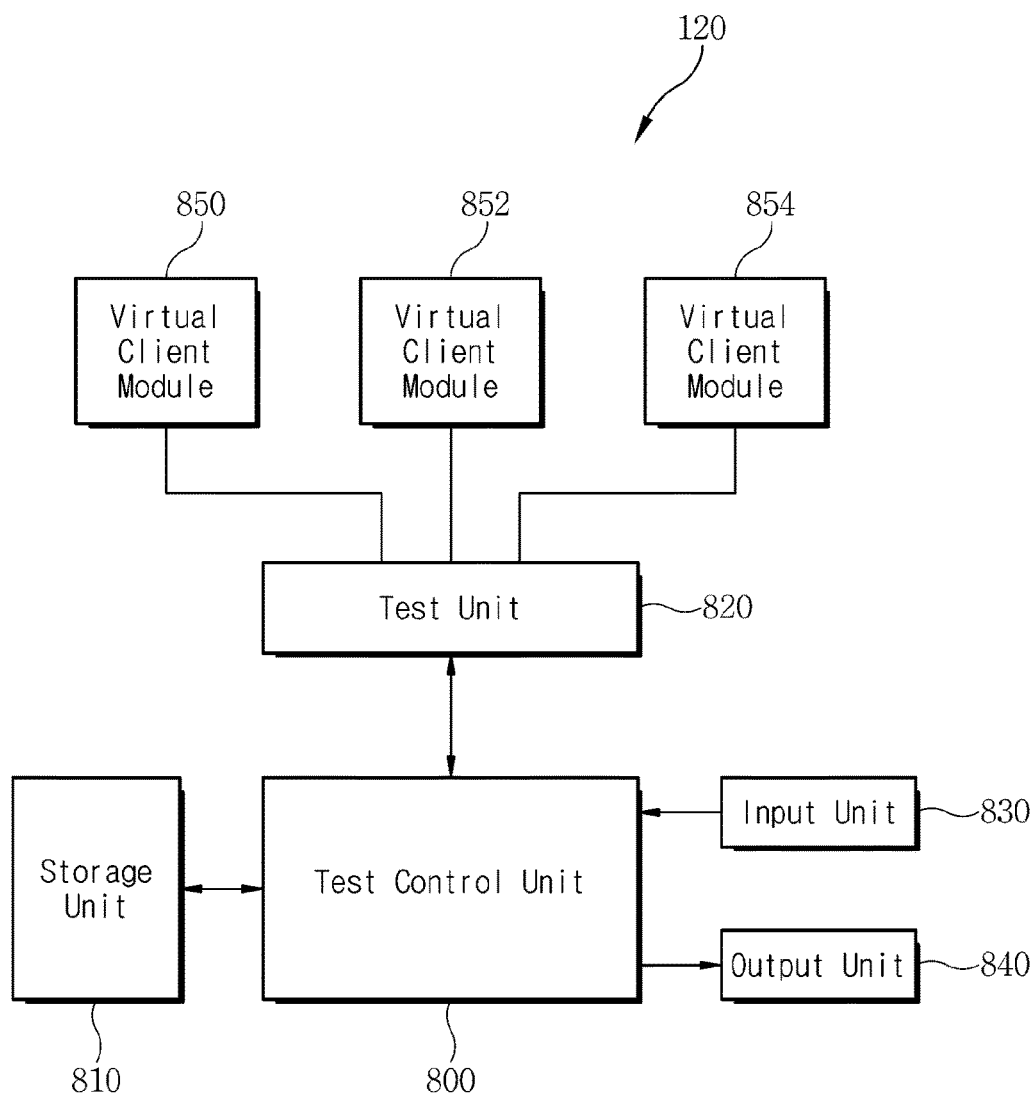
FIG. 8 is a diagram illustrating a cloud streaming server test apparatus according to another embodiment of the present invention.

FIG. 8 is a diagram illustrating a cloud streaming server test apparatus according to another embodiment of the present invention.

Referring to FIG. 8, the test apparatus 120 may be configured to include a test control unit 800, a storage unit 810, a test unit 820, an input unit 830, an output unit 840, and at least one client module 850, 852 or 854. Although three virtual client modules 850, 852 and 854 are exemplarily shown in this embodiment, the number of the virtual client modules 850, 852 and 854 may be varied depending on a system operation.

The test control unit 800 performs the whole control required for determining whether there is a failure of the cloud streaming servers 130, 140 and 150. When it is requested to determine a failure, the test control unit 800 determines a failure or not of the cloud streaming server, based on a comparison result obtained through the test unit 820, namely, depending on whether a result image created by capturing an output screen of a test result is identical with a predetermined reference result image. In this case, a time point of a request for determination of a failure may be a time point when a test result is completely received from the virtual client module 850, 852 or 854, a time point when there is an input of a request for determination of a failure through the input unit 830, or a predetermined periodic time point. Namely, a request for determination of a failure may depend on setting. Additionally, the reference result image may be stored in advance, or a result image outputted from a specific virtual client module among the at least one virtual client modules 850, 852 and 854 may be defined as the reference result image.

Particularly, the test control unit 800 may determine a failure or not, depending on a detection result of an error in a connection between the virtual client module and the cloud streaming server.

Meanwhile, if compared two images are identical with each other, the test control unit 800 determines that the cloud streaming server has no failure. If two images are not identical, the test control unit 800 determines that the cloud streaming server has a failure.

Further, the test control unit 800 may create a failure report by distinguishing a failure corresponding to a comparison result indicating that two compared images are not identical, from a failure corresponding the connection error.

Additionally, if the number of cloud streaming servers determined as having failures before changing the reference server is greater, by a predetermined number or more, than the number of cloud streaming servers determined as having failures after changing the reference server, the test control unit 800 may determine that there is a failure in the reference server before changed.

The storage unit 810 may store information required for the operation of the test apparatus 120. The storage unit 810 stores information about a capture time point for capturing, at the same time, result videos for test results transmitted from at least one cloud streaming server 130, 140 or 150. In addition, the storage unit 810 may store basic information about a test result transmitted from the cloud streaming servers. Particularly, the storage unit 810 may store in advance a reference image of a specific time point to be used for determining a failure or not of the cloud streaming server. The storage unit 810 may include a magnetic media such as a hard disk, a floppy disk or a magnetic tape, an optical media such as a compact disk read only memory (CD-ROM) or a digital video disk (DVD), a magneto-optical media such as a floptical disk, a ROM, a random access memory (RAM), and a flash memory.

The test unit 820 may request, under the control of the test control unit 800, a delivery of a test result video received at each of the virtual client modules 850, 852 and 854 and then outputted as a screen. Additionally, the test unit 820 compares the test result image, created by capturing the test result video, with a reference result image, and outputs a comparison result to the test control unit 800. For this, the test unit 820 may further perform a process of setting the reference result image. Namely, the test unit 820 may compare a test result image, created by capturing a test result video corresponding to the reference server which is one of the cloud streaming servers, with test result images created by capturing test result videos corresponding to other cloud streaming servers.

In this case, the test result images corresponding to other cloud streaming servers may be captured at the same time point as the test result image corresponding to the reference server.

Particularly, the test unit 820 may detect a connection error between the virtual client modules and the cloud streaming servers.

In this case, the connection error may include one or more of a failure in a connection try, from one of the client modules to one of the cloud streaming servers, and a failure in a test result transmission.

If the connection error is detected, the test unit 820 may not perform a test by comparison with the reference server with regard to the cloud streaming server corresponding to the connection error.

The input unit 830 may create a user input signal corresponding to a request or information of a cloud streaming server manager depending on such manager's manipulations. The input unit 830 may be implemented by various input mechanisms which are currently commercialized or expected to be commercialized, including, for example, a normal input device such as a keyboard, a mouse, a joystick, a touch screen, a touch pad, etc., and a gesture input device which detects a user's motion and thereby creates a specific input signal.

The output unit 840 is a device for allowing a user to perceive an operation result or state of the test apparatus 120, including, for example, a display unit for offering a visual output onto a screen, a speaker for outputting an audible sound, and the like. Particularly, in this invention, the output unit 840 may output visually a result image processed and outputted from the at least one virtual client module 850, 852 or 854, compare the result image with the reference result image, output a comparison result, and display a failure or not of the cloud streaming server.

The virtual client module 850, 852 or 854, which virtualizes the client 100, 101 or 102 that accesses the cloud streaming server 130, 140 or 150 and is offered a cloud streaming service, may actually perform at least some functions of the client 100, 101 or 102. For example, the virtual client module 850, 852 or 854 may access a specific one of the cloud streaming servers 130, 140 and 150, receive a test result from the specific cloud streaming server 130, 140 or 150, create a test result video by performing the same processing (e.g., decoding) with regard to the received test result as the client 100, 101 or 102 performs, and output the created test result video on the screen through the output unit 840. Also, in response to a request for a result image from the test unit 820, the virtual client module 850, 852 or 854 may capture the result image outputted on the screen at a specific time point and then deliver it to the test unit 820. Information about the capture time point may be received from the test unit 820 or previously set and stored. Capturing the result image may be performed, for example, in a manner of capturing image data stored in a frame buffer of the virtual client module 850, 852 or 854. In another embodiment, capturing the test result video and creating the test result image may be alternatively performed at the test unit 820.

Namely, the virtual client module 850, 852 or 854 offers a test script key input to the cloud streaming server, receives a test result corresponding to the test script key input from the cloud streaming server, and creates a test result video by decoding the test result. In this case, the test result may be an encoded streaming video, and the test result video may be a decoded streaming video.

The internal configuration of the virtual client module 850, 852 or 854 is as shown in FIG. 3.

Figure 9:
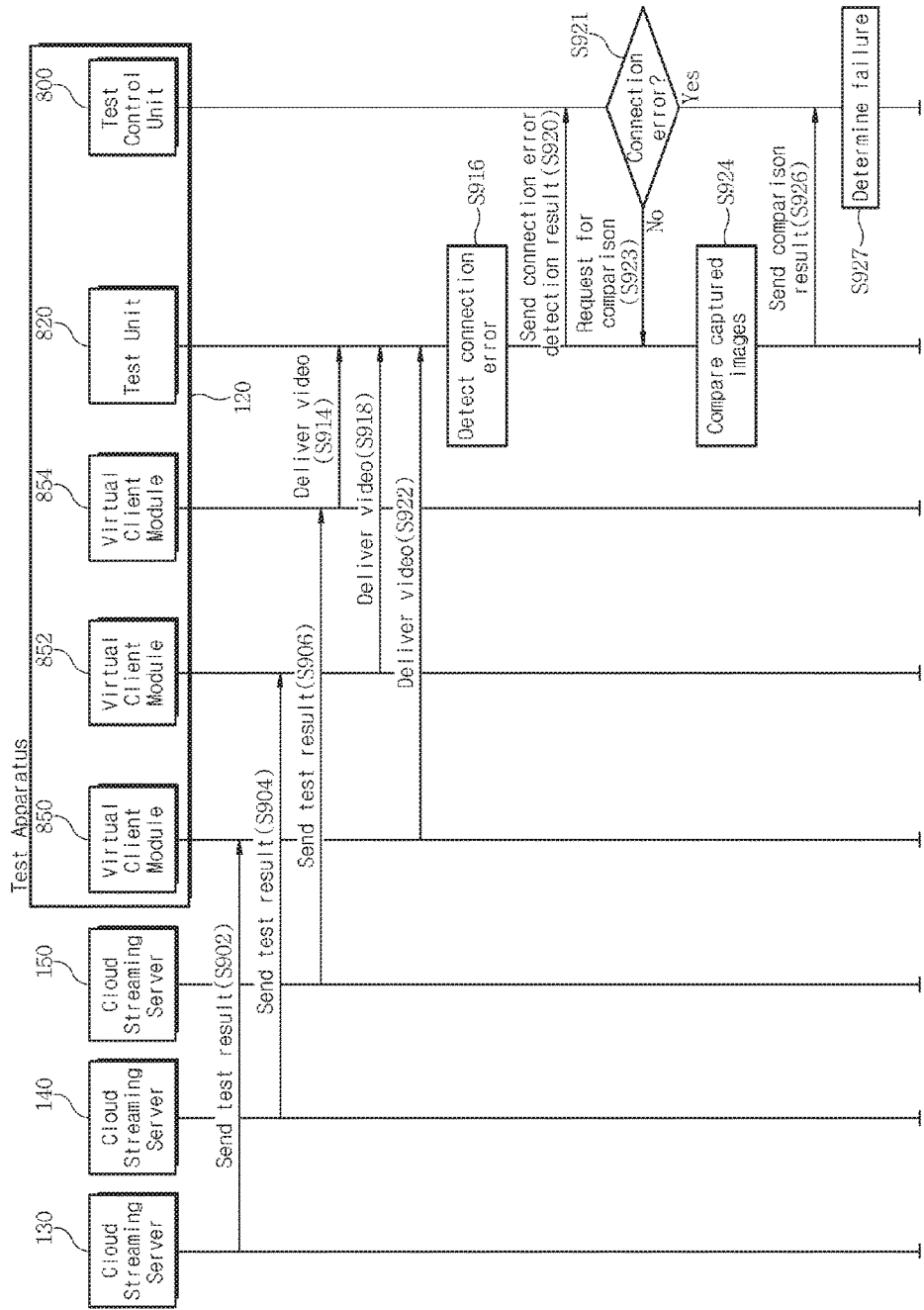
FIG. 9 is a flow diagram illustrating a test process at a test system for a cloud streaming server according to an embodiment of the present invention.

FIG. 9 is a flow diagram illustrating a process of testing whether a cloud streaming server operates normally, at a test system according to an embodiment of the present invention.

The cloud streaming servers 130, 140 and 150 transmit simultaneously test results to the virtual client modules 850, 852 and 854 of the test apparatus 120 (steps S902 to S906). Namely, one client streaming server 130 may send a test result to the virtual client module 850, another cloud streaming server 140 may send a test result to the virtual client module 852, and the other cloud streaming server 150 may send a test result to the virtual client module 854. Contrary to this, one virtual client module may receive sequentially, at intervals, test results from a plurality of cloud streaming servers 130, 140 and 150.

In this case, the cloud streaming server 130, 140 or 150 may transmit a test result in response to a test script key input of the virtual client module 850, 852 or 854.

Each of the virtual client modules 850, 852 and 854 creates a test result video by decoding the test result received from the cloud streaming server 130, 140 or 150, and offers the created video to the test unit 820 (steps S914, S918 and S922). At these steps, offering the test result video may be performed in response to a test request from the test control unit 800. Additionally, the test unit 820 may request each of the virtual client modules 850, 852 and 854 to deliver the test result received from the cloud streaming server 130, 140 or 150. At this time, the virtual client module 850, 852 or 854 may create the test result video by processing the received test result as if the client 100, 101 or 102 actually does, and then output the created video on the screen. At this time, the virtual client module 850, 852 or 854 may capture a test result video being outputted to the screen at a time point requested by the test unit 820 or at a predetermined specific time point and then transmit the captured video to the test unit 820. Namely, capturing the test result video and creating a test result image may be performed by the virtual client module 850, 852 or 854 or by the test unit 820.

Meanwhile, the test unit 820 detects an error in a connection between the cloud streaming servers 130, 140 and 150 and the virtual client modules 850, 852 and 854 (step S916).

At this step, the connection error may include one or more of a failure in a connection try of the virtual client module 850 to the cloud streaming server 130 and a failure in the test result transmission (step S902), a failure in a connection try of the virtual client module 852 to the cloud streaming server 140 and a failure in the test result transmission (step S904), and a failure in a connection try of the virtual client module 854 to the cloud streaming server 150 and a failure in the test result transmission (step S906).

The test unit 820 transmits a detection result of the connection error to the test control unit 800 (step S920).

The test control unit 800 determines, based on the connection error detection result, whether any connection error occurs (step S921), and then, if it is determined that no connection error occurs, requests the test unit 820 to compare the test result images (step S923).

The test unit 820 that receives a request for comparison of test result images compares the test result image, obtained by capturing the received test result video, with a predetermined reference result image, and then delivers a comparison result to the test control unit 800 (steps S924 and S926). Here, the reference result image may be a pre-stored result image which will appear when the test result is normally transmitted and outputted. Alternatively, the result image outputted from a predetermined specific one of the virtual client modules 850, 852 and 854 may be set as the reference result image. For this, before performing comparison, the test unit 820 may further perform a step of setting the reference result image.

Then the test control unit 800 determines, based on a comparison result and also depending on whether any connection error occurs, whether the cloud streaming server has a failure. As the result of comparison, if the result image captured from the received test result is not identical with the predetermined reference result image, the test control unit 800 determines that there is a failure in the cloud streaming server (step S927). At this step, if identical, the test control unit 800 determines that there is no failure in the cloud streaming server. At this time, the comparison result is delivered to the test control unit 800 with regard to each of the cloud streaming servers 130, 140 and 150, and then, based on the comparison result, the test control unit 800 may determine whether each cloud streaming server has a failure.

Meanwhile, the test control unit 800 may create a failure report by distinguishing a failure corresponding the connection error from a failure corresponding to a comparison result indicating that two compared images are not identical.

Figure 10:
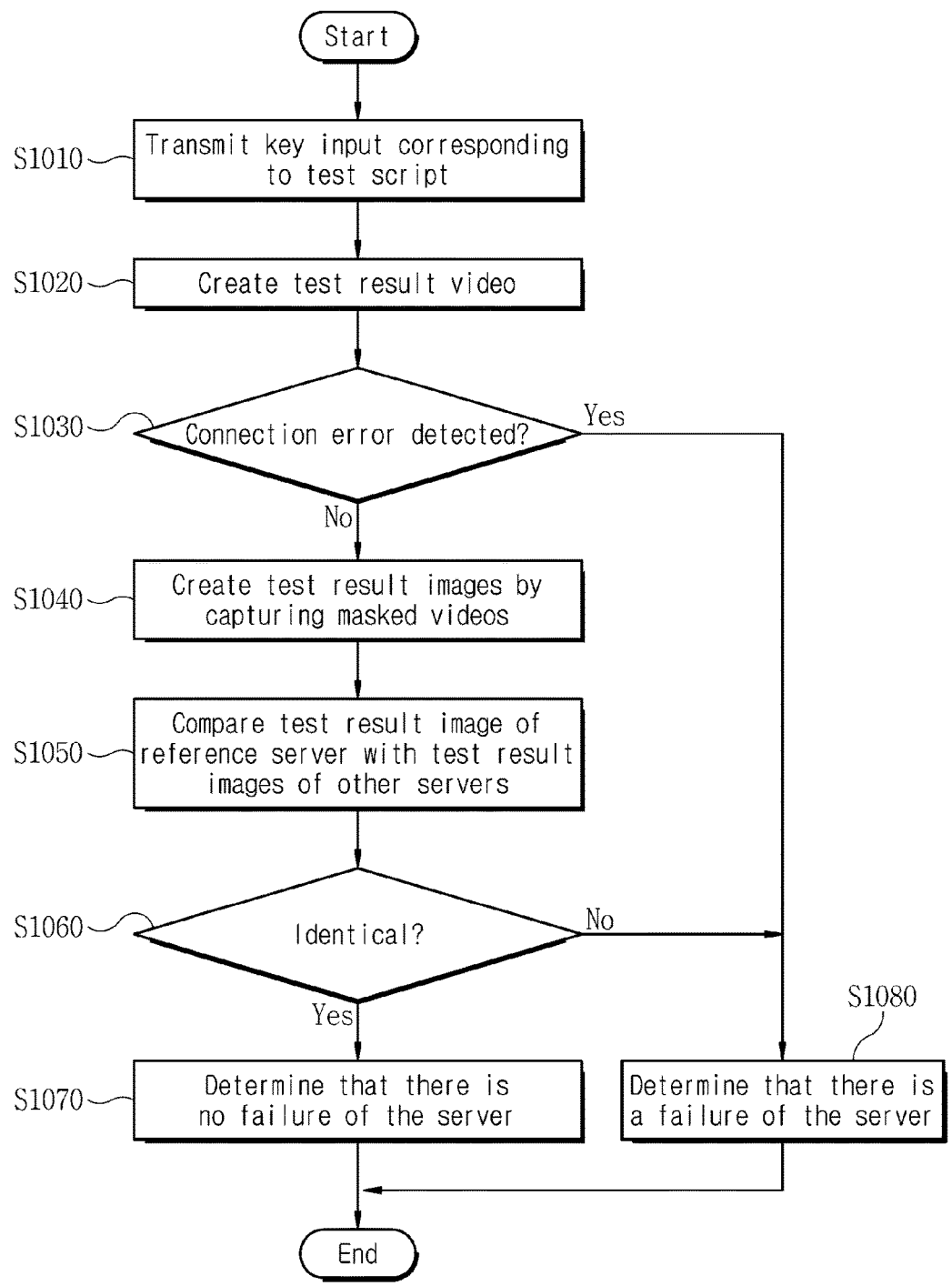
FIG. 10 is a flow diagram illustrating a method for testing a cloud streaming server according to an embodiment of the present invention.

FIG. 10 is a flow diagram illustrating a method for testing, at the test apparatus 120, whether the cloud streaming server 130, 140 or 150 operates normally according to an embodiment of the present invention.

Referring to FIG. 10, in the cloud streaming server test method according to an embodiment of this invention, the virtual client modules transmit a key input corresponding to a test script to the cloud streaming servers (step S1010).

Additionally, in the cloud streaming server test method according to an embodiment of this invention, the virtual client modules receive test results from the cloud streaming servers and then create test result videos (step S1020).

Additionally, in the cloud streaming server test method according to an embodiment of this invention, the test apparatus detects an error in a connection between the virtual client modules and the cloud streaming servers (step S1030).

In this case, the connection error may include one or more of a failure in a connection try, from one of the client modules to one of the cloud streaming servers, and a failure in a test result transmission.

If no connection error is detected at step S1030, the test apparatus in the cloud streaming server test method according to an embodiment of this invention creates test result images by capturing the test result videos (step S1040).

At this time, the test result images corresponding to the cloud streaming servers may be captured at the same time point as the test result image corresponding to the reference server.

Also, step S1040 may be performed by the virtual client modules 850, 852 and 854 shown in FIG. 8 or by the test unit 820.

Additionally, in the cloud streaming server test method according to an embodiment of this invention, the test apparatus compares the test result image of the reference server with the test result image of other cloud streaming servers, and thereby determines whether compared images are identical with each other (steps S1050 and S1060).

If the compared images are identical, the test apparatus in the cloud streaming server test method according to an embodiment of this invention determines that there is no failure in the cloud streaming server (step S1070).

If the compared images are not identical, the test apparatus in the cloud streaming server test method according to an embodiment of this invention determines that there is any failure in the cloud streaming server (step S1080).

If any connection error is detected at step S1030, the test apparatus in the cloud streaming server test method according to an embodiment of this invention determines that there is any failure in the cloud streaming server (step S1080). Namely, if any connection error is detected, the test apparatus in the cloud streaming server test method according to an embodiment of this invention may not perform a test step of comparing the test result images.

At step S1080, the test apparatus may create a failure report in which a failure corresponding the connection error is distinguished from another failure corresponding to a comparison result indicating that two compared images are not identical.

Figure 11:
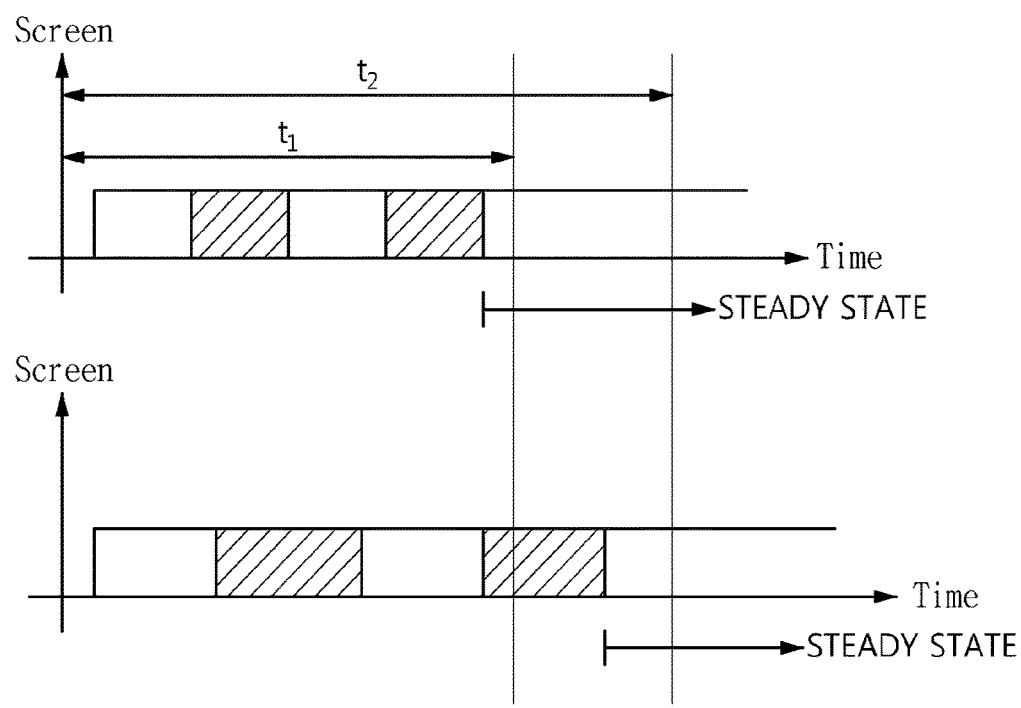
FIG. 11 is a timing diagram illustrating a capture timing of a cloud streaming server test method according to an embodiment of the present invention.

FIG. 11 is a timing diagram illustrating a capture timing of a cloud streaming server test method according to an embodiment of the present invention.

Referring to FIG. 11, even though a predetermined test script key input is transmitted to two cloud streaming servers at the same timing, such cloud streaming servers may have different speeds of response.

For example, the virtual client modules may access the cloud streaming servers at different times, key inputs may be entered into the cloud streaming servers at different times, or the cloud streaming servers may process key inputs at different times. For such reasons, the test result videos received from the cloud streaming servers may have different timings of entering into a steady state.

In an example shown in FIG. 11, if a capture for the test result videos is performed at the first capture timing (t1), a wrong test result may be caused since a lower test result video is not yet entered into its steady state. If a capture for the test result videos is performed at the second capture timing (t2), a correct test result may be obtained since both upper and lower test result videos have been already entered into their steady states.

Therefore, it is very important to capture the test result videos after a steady state condition according to a test script key input is satisfied.

Now, a process of testing, at the above-discussed test system, whether the cloud streaming server operates normally will be described in detail with reference to FIGS. 12 and 13.

Figure 12:
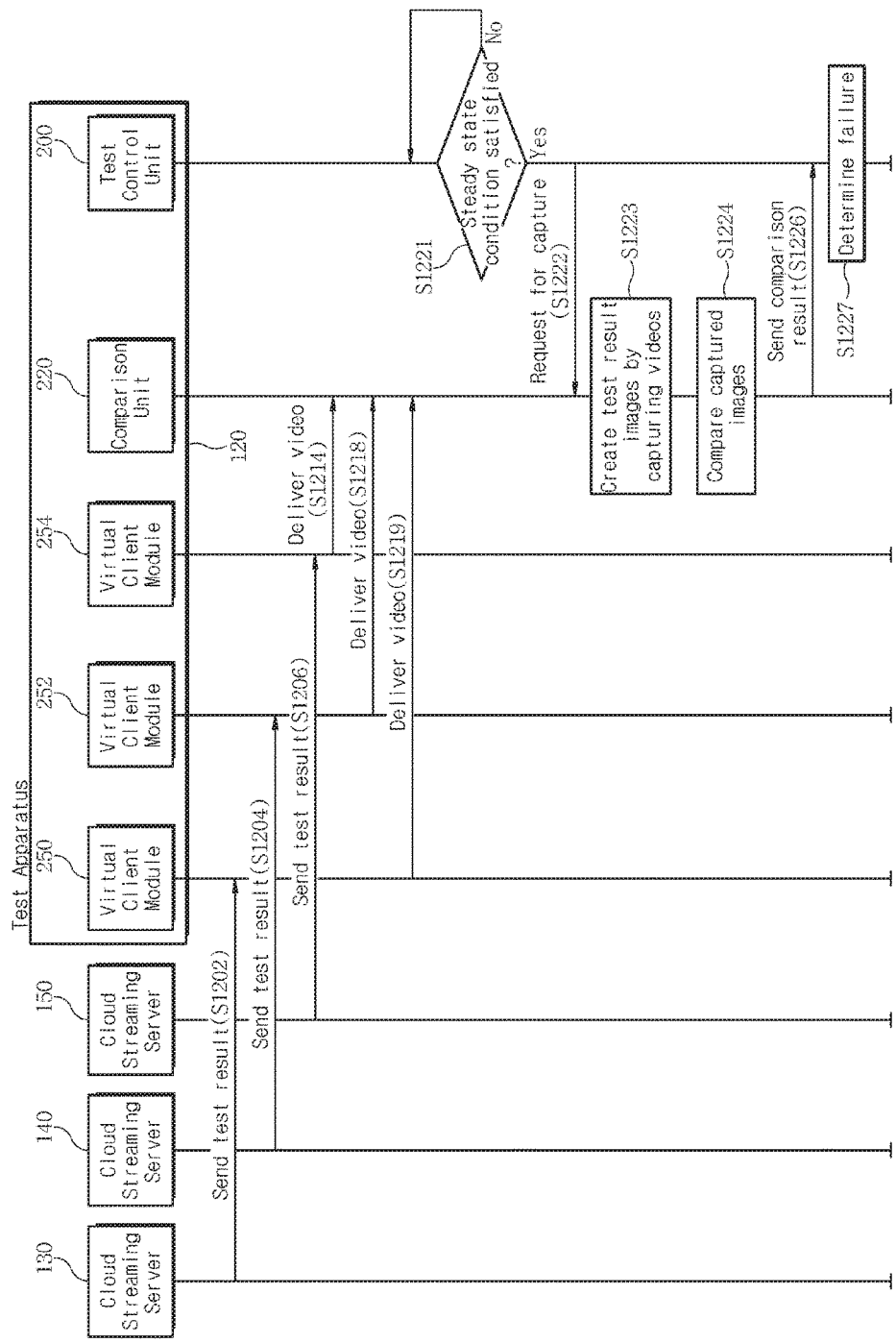
FIG. 12 is a flow diagram illustrating a test process at a test system for a cloud streaming server according to an embodiment of the present invention.

FIG. 12 is a flow diagram illustrating a test process at a test system for a cloud streaming server according to an embodiment of the present invention.

The cloud streaming servers 130, 140 and 150 transmit simultaneously test results to the virtual client modules 250, 252 and 254 of the test apparatus 120 (steps S1202 to S1206). Namely, one client streaming server 130 may send a test result to the virtual client module 250, another cloud streaming server 140 may send a test result to the virtual client module 252, and the other cloud streaming server 150 may send a test result to the virtual client module 254. Contrary to this, one virtual client module may receive sequentially, at intervals, test results from a plurality of cloud streaming servers 130, 140 and 150.

In this case, the cloud streaming server 130, 140 or 150 may transmit a test result in response to a test script key input of the virtual client module 250, 252 or 254.

Each of the virtual client modules 250, 252 and 254 creates a test result video by decoding the test result received from the cloud streaming server 130, 140 or 150, and offers the created video to the comparison unit 220 (steps S1214, S1218 and S1219). At these steps, offering the test result video may be performed in response to a test request from the test control unit 200. Additionally, the comparison unit 220 may request each of the virtual client modules 250, 252 and 254 to deliver the test result received from the cloud streaming server 130, 140 or 150. At this time, the virtual client module 250, 252 or 254 may create the test result video by processing the received test result as if the client 100, 101 or 102 actually does, and then output the created video on the screen. The created test result video may be captured by the comparison unit after a steady state condition is satisfied.

Namely, the test control unit 200 determines whether the steady state condition is satisfied or not (step S1221), and then transmits a request for capture to the comparison unit 220 (step S1222) only if the steady state condition is satisfied.

The comparison unit 220 that receives the capture request captures the test result video corresponding to a reference server, which is one of the cloud streaming servers 130, 140 and 150, and the test result videos corresponding to other cloud streaming servers, and then creates test result images (step S1223).

Although FIG. 12 exemplarily shows that capturing the test result video is performed by the comparison unit 220, the capture request may be delivered to the virtual client modules 250, 252 and 254, which may perform capturing and thereby create the test result images.

The comparison unit 220 compares the test result image, created by capturing each test result video, with a predetermined reference result image, and then delivers a comparison result to the test control unit 200 (steps S1224 and S1226). Here, the reference result image may be a pre-stored result image which will appear when the test result is normally transmitted and outputted. Alternatively, the result image outputted from a predetermined specific one of the virtual client modules 250, 252 and 254 may be set as the reference result image. For this, before performing comparison, the comparison unit 220 may further perform a step of setting the reference result image.

Then the test control unit 200 determines, based on a comparison result and also depending on whether any connection error occurs, whether the cloud streaming server has a failure. As the result of comparison, if the result image captured from the received test result is not identical with the predetermined reference result image, the test control unit 200 determines that there is a failure in the cloud streaming server (step S1227). At this step, if identical, the test control unit 200 determines that there is no failure in the cloud streaming server. At this time, the comparison result is delivered to the test control unit 200 with regard to each of the cloud streaming servers 130, 140 and 150, and then, based on the comparison result, the test control unit 200 may determine whether each cloud streaming server has a failure.

Figure 13:
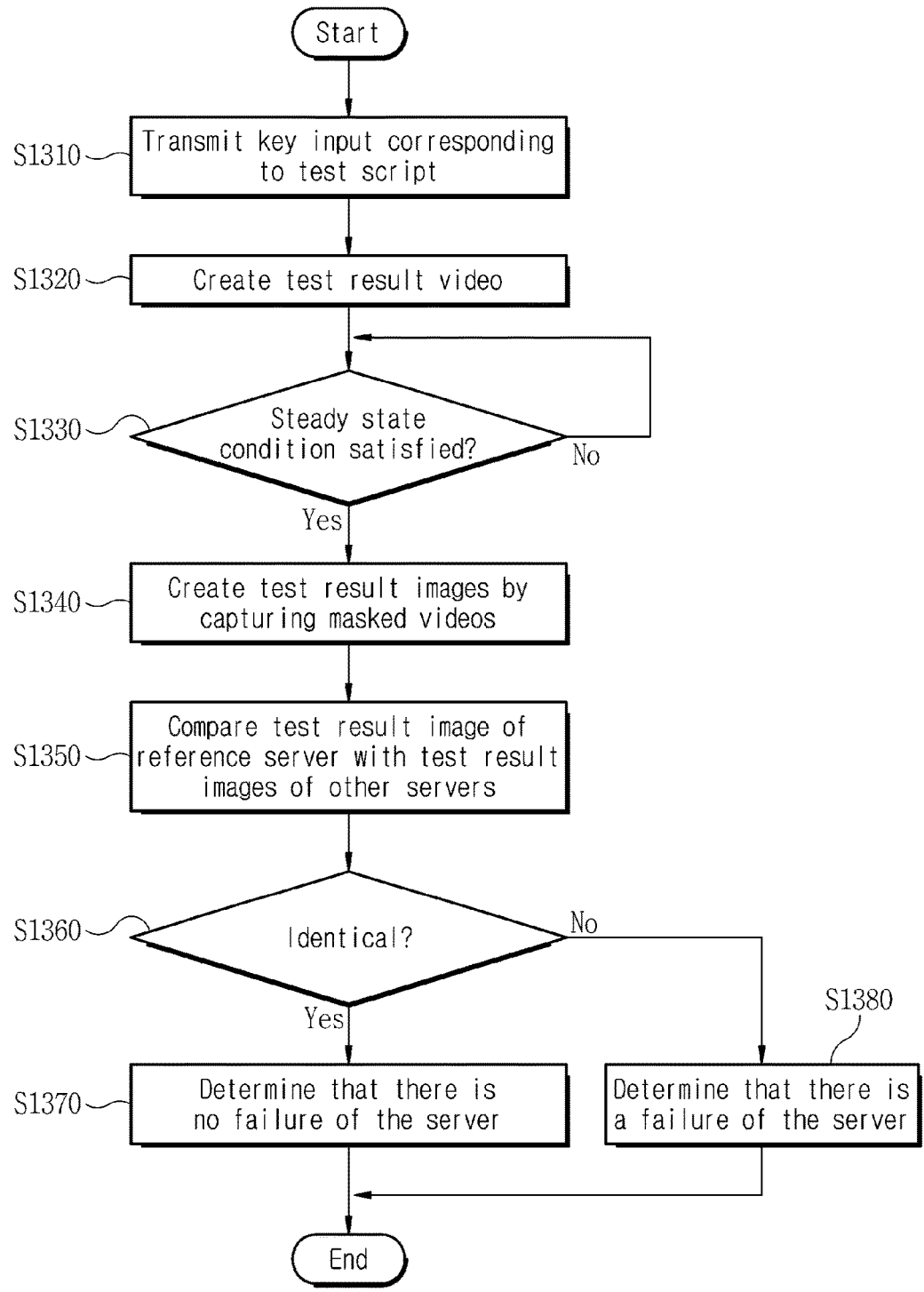
FIG. 13 is a flow diagram illustrating a method for testing a cloud streaming server according to an embodiment of the present invention.

FIG. 13 is a flow diagram illustrating a method for testing, at the test apparatus 120, whether the cloud streaming server 130, 140 or 150 operates normally according to an embodiment of the present invention.

Referring to FIG. 13, in the cloud streaming server test method according to an embodiment of this invention, the virtual client modules transmit a key input corresponding to a test script to the cloud streaming servers (step S1310).

Additionally, in the cloud streaming server test method according to an embodiment of this invention, the virtual client modules receive test results from the cloud streaming servers and then create test result videos (step S1320).

Additionally, in the cloud streaming server test method according to an embodiment of this invention, the test apparatus determines whether the steady state condition is satisfied or not (step S1330).

In this case, the steady state condition may be an elapse condition of a predetermined time which is determined according to the test script.

In this case, whether the elapse condition is satisfied or not may be determined depending on whether the predetermined time elapses from the timing when the predetermined test script key input is transmitted.

In this case, the steady state condition may be determined differently depending on the predetermined test script key input.

If it is determined at step S1330 that the steady state condition is satisfied, the test apparatus in the cloud streaming server test method according to an embodiment of this invention creates test result images by capturing the test result videos (step S1340).

At this time, the test result images corresponding to the cloud streaming servers may be captured at the same time point as the test result image corresponding to the reference server.

Also, step S1340 may be performed by the virtual client modules 250, 252 and 254 shown in FIG. 2 or by the comparison unit 220.

Additionally, in the cloud streaming server test method according to an embodiment of this invention, the test apparatus compares the test result image of the reference server with the test result image of other cloud streaming servers, and thereby determines whether compared images are identical with each other (steps S1350 and S1360).

If the compared images are identical, the test apparatus in the cloud streaming server test method according to an embodiment of this invention determines that there is no failure in the cloud streaming server (step S1370).

If the compared images are not identical, the test apparatus in the cloud streaming server test method according to an embodiment of this invention determines that there is any failure in the cloud streaming server (step S1380).

Figure 14:
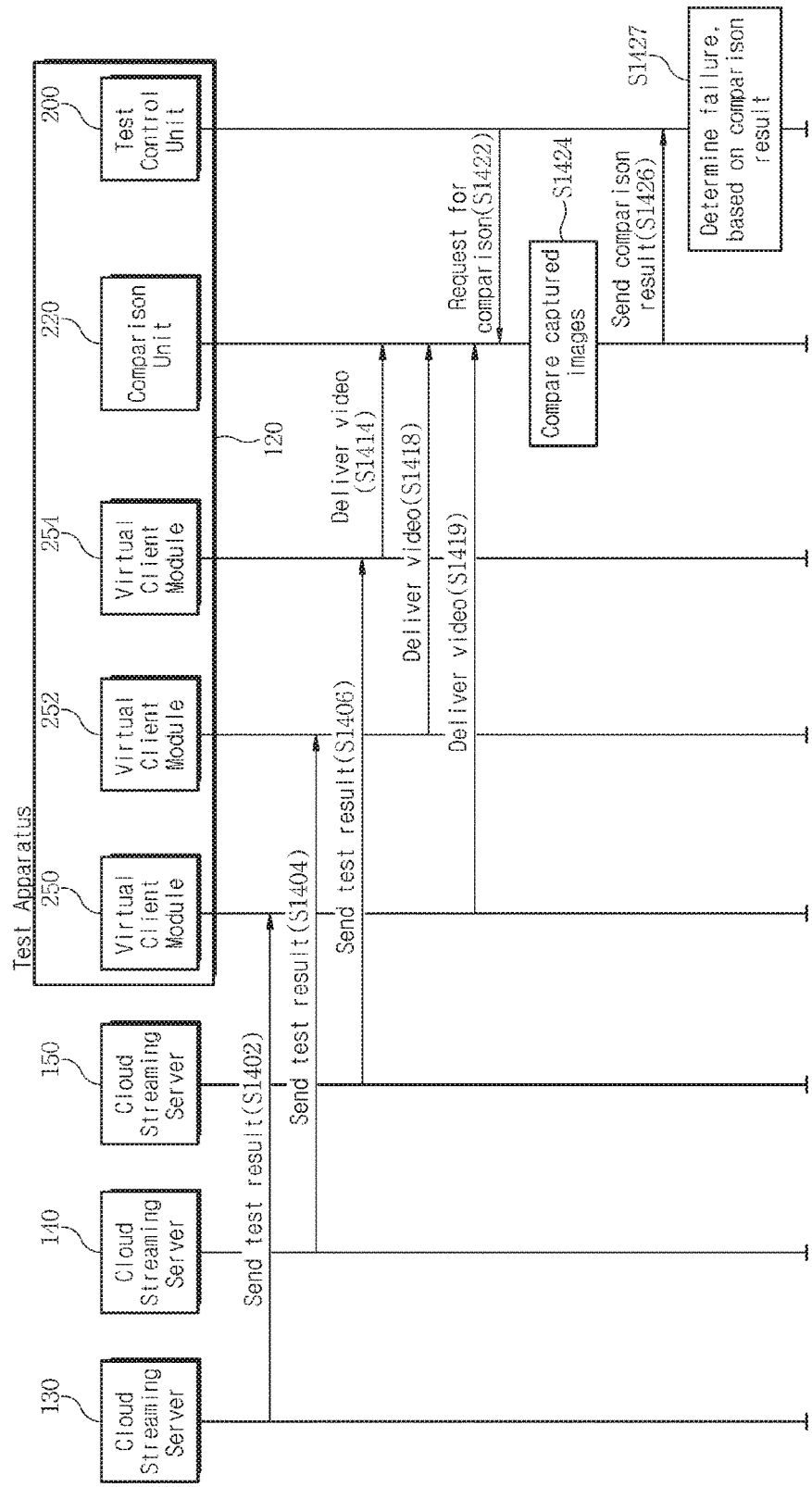
FIG. 14 is a flow diagram illustrating a test process at a test system for a cloud streaming server according to an embodiment of the present invention.

FIG. 14 is a flow diagram illustrating a test process at a test system for a cloud streaming server according to an embodiment of the present invention.

The cloud streaming servers 130, 140 and 150 transmit simultaneously test results to the virtual client modules 250, 252 and 254 of the test apparatus 120 (steps S1402 to S1406). Namely, one client streaming server 130 may send a test result to the virtual client module 250, another cloud streaming server 140 may send a test result to the virtual client module 252, and the other cloud streaming server 150 may send a test result to the virtual client module 254. Contrary to this, one virtual client module may receive sequentially, at intervals, test results from a plurality of cloud streaming servers 130, 140 and 150.

In this case, the cloud streaming server 130, 140 or 150 may transmit a test result in response to a common test script key input of the virtual client module 250, 252 or 254. Further, the common test script key input may correspond to a common screen for two or more applications, and the common screen may be a screen from which any animation effect is excluded.

Each of the virtual client modules 250, 252 and 254 creates a test result video by decoding the test result received from the cloud streaming server 130, 140 or 150, and offers the created video to the comparison unit 220 (steps S1414, S1418 and S1419). At these steps, offering the test result video may be performed in response to a test request from the test control unit 200. Additionally, the comparison unit 220 may request each of the virtual client modules 250, 252 and 254 to deliver the test result received from the cloud streaming server 130, 140 or 150. At this time, the virtual client module 250, 252 or 254 may create the test result video by processing the received test result as if the client 100, 101 or 102 actually does, and then output the created video on the screen. At this time, the virtual client module 250, 252 or 254 may capture an operating case video being outputted to the screen at a time point requested by the comparison unit 220 or at a predetermined specific time point and then transmit the captured video to the comparison unit 220. Namely, capturing the operating case video and creating an operating case image may be performed by the virtual client module 250 or the comparison unit 220.

The test control unit 200 requests the comparison unit 220 to compare the test result images, based on an external input, the satisfaction of an internal execution condition, or the like (step S1422).

The comparison unit 220 that receives the request for comparison of test result images compares the test result image, created by capturing each of the received test result videos, with a predetermined reference result image, and then delivers a comparison result to the test control unit 200 (steps S1424 and S1426). Here, the reference result image may be a pre-stored result image which will appear when the test result is normally transmitted and outputted. Alternatively, the result image outputted from a predetermined specific one of the virtual client modules 250, 252 and 254 may be set as the reference result image. For this, before performing comparison, the comparison unit 220 may further perform a step of setting the reference result image.

Then the test control unit 200 determines, based on a comparison result and also depending on whether any connection error occurs, whether the cloud streaming server has a failure. As the result of comparison, if the result image captured from the received test result is not identical with the predetermined reference result image, the test control unit 200 determines that there is a failure in the cloud streaming server (step S1427). At this step, if identical, the test control unit 200 determines that there is no failure in the cloud streaming server. At this time, the comparison result is delivered to the test control unit 200 with regard to each of the cloud streaming servers 130, 140 and 150, and then, based on the comparison result, the test control unit 200 may determine whether each cloud streaming server has a failure.

Figure 15:
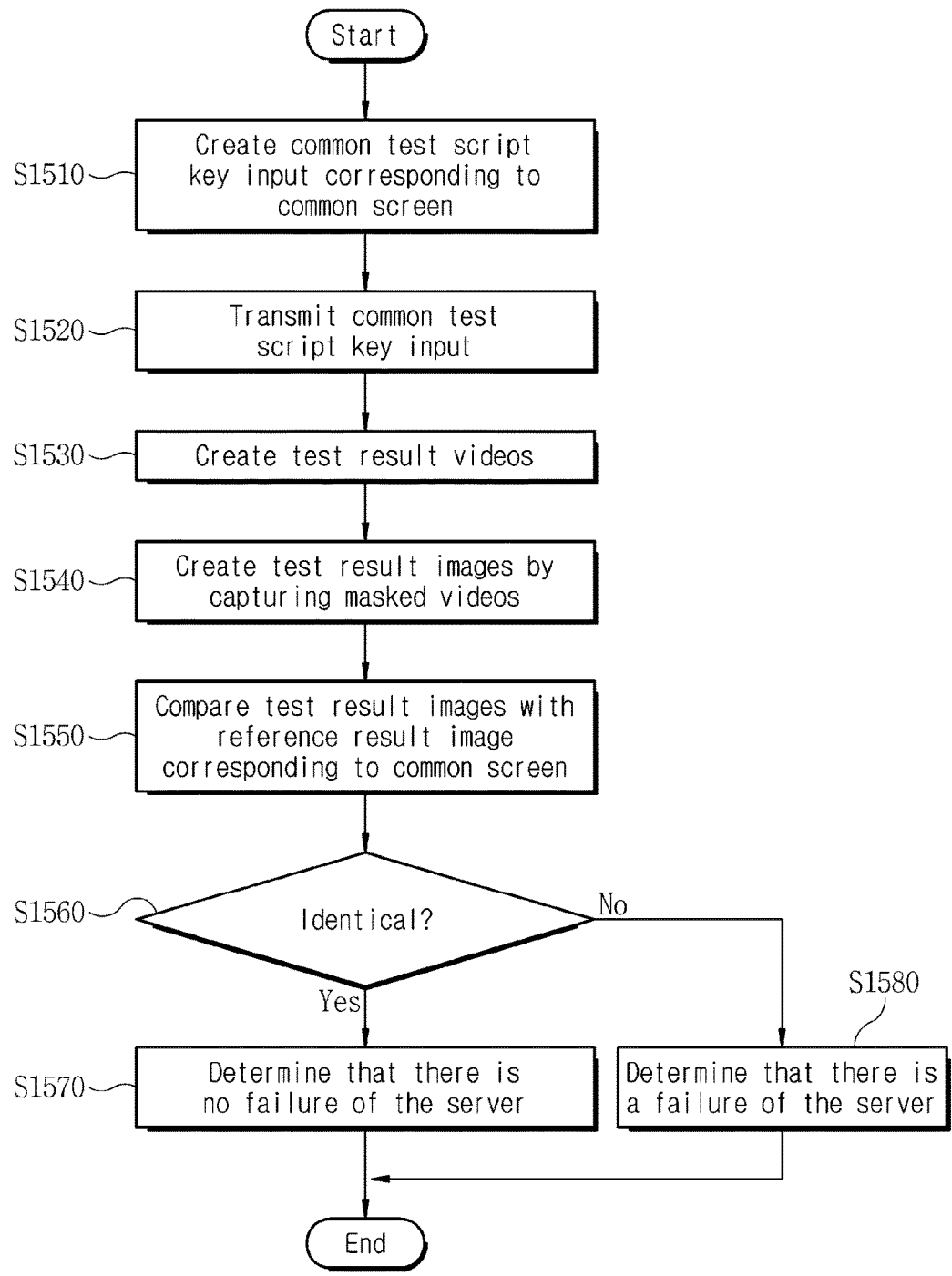
FIG. 15 is a flow diagram illustrating a method for testing a cloud streaming server according to an embodiment of the present invention.

FIG. 15 is a flow diagram illustrating a method for testing, at the test apparatus 120, whether the cloud streaming server 130, 140 or 150 operates normally according to an embodiment of the present invention.

Referring to FIG. 15, in the cloud streaming server test method according to an embodiment of this invention, the virtual client modules create a common test script key input corresponding to a common screen (step S1510).

In this case, the common test script key input may enable two or more different applications to create the same common screen.

Further, the common screen may be a screen from which any animation effect is excluded.

Additionally, in the cloud streaming server test method according to an embodiment of this invention, the virtual client modules transmit the common test script key input to the cloud streaming servers (step S1520).

Additionally, in the cloud streaming server test method according to an embodiment of this invention, the virtual client modules receive test results corresponding to the common test script key input from the cloud streaming servers and then create test result videos (step S1530).

Additionally, in the cloud streaming server test method according to an embodiment of this invention, the test apparatus creates test result images by capturing the test result videos (step S1540).

At this time, the test result images corresponding to the cloud streaming servers may be captured at the same time point as a reference result image.

Also, step S1540 may be performed by the virtual client modules 250, 252 and 254 shown in FIG. 2 or by the comparison unit 220.

Additionally, in the cloud streaming server test method according to an embodiment of this invention, the test apparatus compares the reference result image with the test result image of the cloud streaming servers, and thereby determines whether compared images are identical with each other (steps S1550 and S1560).

In this case, the reference result image may be created by capturing the test result video corresponding to a reference server which is one of the cloud streaming servers. Alternatively, the reference result image may be created previously and stored in the test apparatus.

If the compared images are identical, the test apparatus in the cloud streaming server test method according to an embodiment of this invention determines that there is no failure in the cloud streaming server (step S1570).

If the compared images are not identical, the test apparatus in the cloud streaming server test method according to an embodiment of this invention determines that there is any failure in the cloud streaming server (step S1580).

The respective steps shown in FIGS. 4 to 7, FIGS. 9 and 10, and FIGS. 12 to 15 may be performed in the illustrated order, or in the reverse order, or simultaneously.

The streaming server test method and the reference server change method according to the present invention may be implemented by a program or smart phone application which may be executed through various computer means. Such a program or smart phone application may be recorded on a non-transitory computer-readable recording medium, which may include a program command, a data file, a data structure, etc. alone or in combination. The program command recorded on the medium is designed or configured especially for the invention, or known to those skilled in computer software. The non-transitory computer-readable recording medium includes magnetic media such as a hard disk, a floppy disk, and a magnetic tape, optical media such as a CD-ROM and a DVD, magneto-optical media such as a floptical disk, and hardware devices specially configured to store and perform a program command, such as a ROM, a RAM, a flash memory and the like. In addition, the program command may include high-class language codes, which can be executed in a computer by using an interpreter, as well as machine codes made by a compiler. This hardware device may be configured to operate as one or more software modules in order to perform the operation of this invention, and vice versa.

As discussed hereinbefore, the streaming server test system, the streaming server test method, and the device for the method may not only specifically use the above embodiments, but also use various modifications of the above embodiments.

This invention relates to a system for testing whether a cloud streaming server for providing a specific service, especially a cloud streaming service, operates normally. This invention can prevent in advance a transmission error or failure in data transmission of the cloud streaming server and also easily detect a failure of the cloud streaming server. This invention can contribute the development of industry by stabilizing a cloud streaming service and also enhancing a service quality.

What is claimed is:

1. A cloud streaming server test apparatus comprising:
a processor configured to control:
a first virtual client module to:
receive a first test result from a first cloud streaming server, wherein the first test result corresponds to a processing, by the first cloud streaming server, of a predetermined test script key input; and
generate a first test result video based on the first test result;
a second virtual client module to:
receive a second test result from a second cloud streaming server, wherein the second test result corresponds to a processing, by the second cloud streaming server, of the predetermined test script key input; and
generate a second test result video based on the second test result;
a comparison module to, when a steady state condition is satisfied, compare test result images obtained from the first test result video and the second result video; and
a test control module to determine, based on a comparison result, whether at least one of the cloud streaming servers has a failure, and
wherein the steady state condition is an elapse condition of a predetermined time which is determined according to the predetermined test script key input.

2. The cloud streaming server test apparatus of claim 1, wherein the processor is further configured to control the comparison module to designate the first cloud streaming server as a reference server for comparing the test result images obtained from the first test result video and the second result video; and
wherein the processor is configured to control the test control module to change designation of the reference server to the second cloud streaming server when a change condition for the reference server is satisfied.

3. The cloud streaming server test apparatus of claim 1, wherein the processor is configured to control the comparison module to detect an error in a connection between the virtual client modules and the cloud streaming servers.

4. The cloud streaming server test apparatus of claim 1, wherein the test script key input enables two or more different applications to create a same common screen.

5. The cloud streaming server test apparatus of claim 1, wherein the processor is configured to control the comparison module to:
create masked videos by masking the first test result video and the second test result video; and
compare test result images, created by capturing the masked videos, with each other.

6. A cloud streaming server test method, the cloud streaming server test method performed by a cloud streaming server test apparatus comprising a processor, the cloud streaming server test method comprising:
receiving, from a first cloud streaming server, a first test result corresponding to a predetermined test script key input to the first cloud streaming server;
generating a first test result video based on the first test result;

receiving, from a second cloud streaming server, a second test result corresponding to the predetermined test script key input to the second cloud streaming server;

generating a second test result video based on the second test result;

comparing, when a steady state condition is satisfied, test result images obtained from the first test result video and the second test result video;

determining, based on a comparison result, whether at least one of the cloud streaming servers has a failure; and wherein the steady state condition is an elapse condition of a predetermined time which is determined according to the predetermined test script key input.

7. The cloud streaming server test method of claim 6, further comprising:

designating the first cloud streaming server as a reference server for comparing the test result images obtained from the first test result video and the second result video; and changing designation of the reference server to the second cloud streaming server when a change condition for the reference server is satisfied.

8. The cloud streaming server test method of claim 6, further comprising:

detecting an error in a connection between the virtual client modules and the cloud streaming servers.

9. The cloud streaming server test method of claim 6, wherein the test script key input enables two or more different applications to create a same common screen.

10. The cloud streaming server test method of claim 6, further comprising:

creating masked videos by masking the first test result video and the second test result video; and wherein the comparing includes comparing test result images, created by capturing the masked videos, with each other.

* * * * *